United States Patent
Bae et al.

(10) Patent No.: US 9,031,799 B2
(45) Date of Patent: May 12, 2015

(54) REMOTE ELECTRICAL SAFETY DIAGNOSIS SYSTEM AND APPARATUS

(75) Inventors: Seok Myoung Bae, Seoul (KR); Sang Ick Lee, Namyangju-si (KR); Gi Hyun Kim, Namyangju-si (KR)

(73) Assignee: Korea Electrical Safety Corporation (KR)

( * ) Notice: Subject to any disclaimer, the term of this patent is extended or adjusted under 35 U.S.C. 154(b) by 591 days.

(21) Appl. No.: 13/496,258

(22) PCT Filed: Nov. 30, 2009

(86) PCT No.: PCT/KR2009/007066
§ 371 (c)(1),
(2), (4) Date: Apr. 2, 2012

(87) PCT Pub. No.: WO2011/034253
PCT Pub. Date: Mar. 24, 2011

(65) Prior Publication Data
US 2012/0185185 A1   Jul. 19, 2012

(30) Foreign Application Priority Data

Sep. 15, 2009 (KR) .................. 10-2009-0086972
Sep. 15, 2009 (KR) .................. 10-2009-0086994
Nov. 28, 2009 (KR) .................. 10-2009-0116287
Nov. 28, 2009 (KR) .................. 10-2009-0116288
Nov. 28, 2009 (KR) .................. 10-2009-0116289

(51) Int. Cl.
*H04Q 9/00* (2006.01)

(52) U.S. Cl.
CPC .......... *H04Q 9/00* (2013.01); *H04Q 2209/823* (2013.01); *H04Q 2209/30* (2013.01)

(58) Field of Classification Search
CPC .................. G01R 31/086; H04Q 9/00
USPC ............................................... 702/58
See application file for complete search history.

(56) References Cited

U.S. PATENT DOCUMENTS

2009/0085572 A1* 4/2009 McGuire et al. ............ 324/500
2010/0169030 A1* 7/2010 Parlos .......................... 702/58

FOREIGN PATENT DOCUMENTS

| KR | 10-2003-0003786 | 1/2003 |
| KR | 200434672 | 12/2006 |
| KR | 10-0755955 | 8/2007 |
| KR | 10-2009-0020220 | 2/2009 |
| KR | 10-2011-0014333 | 2/2011 |

OTHER PUBLICATIONS

International Search Report—PCT/KR2009/007066 dated Sep. 28, 2010.

* cited by examiner

*Primary Examiner* — Bryan Bui
(74) *Attorney, Agent, or Firm* — Cantor Colburn LLP

(57) ABSTRACT

The present invention relates to an electrical safety diagnosis system and apparatus, which are configured to enable sensed data on user surroundings in a U-city environment, such as electrical safety data for switchboards and distribution boards, and water leakages, faulty outlet connections, etc., to be managed remotely by a server at a U-city integrated information center. In particular, the present invention relates to an electrical safety diagnosis system and apparatus which use a U-city integrated information network to preemptively perform checking and analyzes for potential electrically-induced disasters that can occur in public facilities, stores, buildings, and homes within a U-city, by means of a U-city integrated information center, and prevent electrical fires or shocks at the electrical equipment of switchboards or distribution boards, and dangerous conditions (such as water leakages, abnormal temperatures, gas, and faulty outlet connections) in facilities used by users. The remote electrical safety diagnosis system of the present invention comprises: a digital switchboard including the functions of checking electrical equipment in a switchboard room using a contactless arc sensor and a partial discharge sensor on a power line, to diagnose the safety of the electrical equipment, diagnosing an arc or partial discharge in a detected waveform and storing the diagnosed data, and transmitting the diagnosed data to a higher level server; and a digital distribution board including a main circuit breaker and a partial circuit breaker, for checking an AC voltage or current input through the power line, storing the checked data, and transmitting the diagnosed data to the higher level server.

22 Claims, 24 Drawing Sheets

| | Power Supply Side | Load Side | PC 1 | PC 2 |
|---|---|---|---|---|
| Power Input State | H | H | L | L |
| State in Which Circuit Breaker is Broken | H | L | L | H |
| State in Which Main Breaker is Operated | L | L | H | H |

REMOTE ELECTRICAL SAFETY DIAGNOSIS SYSTEM AND APPARATUS

TECHNICAL FIELD

The present invention relates to an electricity safety diagnosis system and an apparatus capable of enabling a server in a remote U-city integration information center to manage electricity safety related data of a switch gear and a distribution panel in U-city environment and data acquired by sensing surrounding environment of users, such as flooding, outlet connection defect, and the like.

More specifically, the present invention relates to an electricity safety diagnosis system and an apparatus capable of enabling a server in a U-city integration information center using a U-city integration information network to previously detect and analyze electrical accidents that may occur in a public institution, a shopping center, a building, a house, and the like, thereby preventing fire or electric shock due to electricity in a distribution panel or a switch gear and a risk of facility environments (flooding, temperature, gas, outlet connection defect, and the like) of users.

BACKGROUND ART

Recently, a demand for an electrical accident prevention system appropriate for electricity safety and a user facility environment in a U-city environment using a newly implemented ubiquitous technology, which is an advanced information communication technology, a space utilization technology has been increased.

The existing switch gear or low voltage distribution panel is a passive type. Recently, a technology in which the switch gear or the low voltage distribution panel is coupled with an electronic controller to measure quality of power and electric power and transmit the measured values in a digital form is being developed.

However, the existing distribution panel or switch gear does not include important components that measures and transmits risk factors of electricity safety and therefore, is inappropriate to apply to a U-city system that is to be coupled with IT technologies so as to improve convenience and safety of life.

Generally, a main factor of electrical fire among electrical accidents may include short circuit, overcurrent, arc, electrical short, and the like. Further, other main factors of electrical fire may further include facility environments (flooding, gas, temperature, outlet connection defect, and the like) of users.

In particular, unwarned outage and electrical accidents due to part defects, isolated deterioration, and the like, have been frequently caused in the existing switch gear. Due to this, there is no method for detecting arc and partial discharge in the switch gear so as to prevent outage and electrical accidents in the existing switch gear.

In addition, the distribution panel used in a house interrupts only a supply of electricity by an operation of a breaker mounted therein at the time of electrical short or overcurrent. Therefore, it is difficult to prevent fire because there are no facilities that can receive information regarding a safety state of the distribution panel, such as gas that may occur due to overload, overheat, and the like, in a breaker connection part, wirings, and the like, in the distribution panel, the connection defect of the outlet mounted in all the constructions such as a house, an apartment, a shopping mall, a building, and the like, and used electrical power, and the like.

Herein, as known, the distribution panel is a device that is again supplied with power from a switch board to open and close circuits in an electric system and distribute power into the house, which may be referred to as an interior distribution panel. Hereinafter, the switch board and the distribution panel are collectively referred to as the distribution panel.

Describing a circuit breaker mounted in the conventional distribution panel, the circuit breaker includes a microswitch mounted therein to transmit its own state.

FIG. 1 shows a three phase circuit breaker having a microswitch mounted therein for detecting a power supply state mounted in the conventional distribution panel. Referring to FIG. 1, the circuit breaker is provided with the micro switch.

Describing this in more detail, the conventional 3 phase circuit breaker having the microswitch mounted therein is operated by switching-on/off contacts of the microswitch using a mechanism therein.

In addition, the circuit breaker is further provided with a remote monitoring unit to transmit the operating state to managers in an external signal form, such that the managers can monitor the circuit breaker.

In other words, the microswitch generates an alarm signal indicating that a trip occurs due to an abnormal state of the circuit breaker and transmits the generated alarm signal to external managers to inform that the circuit breaker has been tripped.

However, in the case of the circuit breaker having a microswitch 10 mounted therein, it is difficult to mount the microswitch in a narrow space, costs are increased due to an increase in labor at the time of mounting the circuit breaker, and a contact loss may occur due to friction in a driving direction of the mechanism.

Further, since it is difficult to substantially mount the microswitch 10 in a small breaker such as a single phase branch breaker, there is no distribution panel having a function for accurately detecting a state of the branch breaker.

In addition, unlike the circuit breaker, it is substantially impossible to configure a distribution panel having microswitches for each branch breaker that is disposed en masse and a line facility transmitting a signal to the outside through the microswitches due to the increased costs and the mounting difficulty.

In addition, a distribution panel having a remote system to enable managers to remotely monitor arc, leakage current, overcurrent, overvoltage, and an on/off state of a breaker at all times has not yet been present.

Further, there is a need to measure AC voltage so as to enable a controller of the conventional distribution panel or the switch board system to monitor or measure power. Herein, the controller of the distribution panel or the switch board system is configured by a circuit isolated from a primary AC side for safety.

However, when an AC voltage measuring circuit or a sensing circuit of the primary side in the system controller is configured in a non-isolated form, the controller isolated from the AC power supply may be again non-isolated from the AC power supply for safety.

A representative example of a method for sensing the isolated AC voltage according to the related art may include a method for implementing isolation using a low-frequency transformer and dropping voltage to acquire a voltage value or a method for using a high-price dedicated semiconductor integrated circuit or dividing a magnitude in AC voltage into low voltage to read the low voltage by each processor. However, the method may increase a volume of a circuit, may degrade integration, and increase weight, which runs against a recent trend of a semiconductor in the electronic industry.

In the case of the related art, the AC voltage sensing circuit has been implemented by various methods. However, an AC voltage terminal is not electrically isolated from a DC voltage terminal.

In other words, when the AC voltage sensing circuit according to the related art uses the method for using a high-price dedicated semiconductor integrated circuit or dividing a magnitude in AC voltage into low voltage to read the low voltage by each processor, an output signal of the dedicated semiconductor integrated circuit and a driving power supply of each processor are commonly connected with a commercial power supply side that is a primary side and a ground. In order to use the read voltage signal as an alarm or a control signal in a secondary system such as various digital devices and the controller, the ground of the secondary side system needs to be also commonly connected therewith.

By this configuration, the primary side and the secondary side that is the ground of the system may not be isolated from each other.

Therefore, the non-isolated AC voltage sensing circuit according to the related art cannot be conveniently used by users in the state in which the digital devices or the controller are not electrically isolated from the AC voltage terminal and applications of the circuit, and the connection operation with other circuits, and the like, may not be easily implemented.

Further, the existing low voltage distribution panel is a passive type. However, recently, the low voltage distribution panel is coupled with an electronic controller to measure the voltage and electric power and display them.

However, the existing low voltage distribution panel does not have the important components for measuring and transmitting the risk factors necessary for the electricity safety. Therefore, when the distribution panel is damaged due to the electrical fire, it is difficult to analyze the fire factors.

In addition, when a current exceeding the rated current flows in the breaker mounted in the existing distribution panel, or the like, the breaker is bent due to a change in expansion coefficients of a bimetal mounted in the breaker to operate the driving contacts of the breaker, thereby interrupting the supply of power. Similarly, when the breaker is operated to interrupt instantaneous current when an inter-phase short accident such as a metal material, or the like, contacts the lower wiring and when the electrical short occurs, an unbalanced current is sensed by a zero current transformer (ZCT) to prevent a fire accident caused by such an electrical short or the electric shock.

However, even though the breaker is mounted, fire accidents caused by electricity frequently occur globally every year. The electrical fire and the electrical shock accidents frequently occur due to various factors such as defects due to arc, carbonization of the driving contacts of the breaker due to a continuous occurrence of electrical short, dielectric breakdown of wirings, an increase in mechanical and electrical stress of the wirings, a damage to the wirings due to overcurrent, defects of wiring connection, and the like.

That is, the existing breaker includes only a breaking component at the time of the occurrence of overcurrent or leakage current and does not include components for detecting the above problems and components for processing and transmitting data so as to enable managers of a remote server of the distribution panel or the switch gear to remotely receive, recognize, and monitor the detection data. Therefore, the above accidents may always happen.

In other words, in order for the managers to remotely recognize signals from the detection sensors included in the breaker, the data needs to be processed. In order to for the breaker to include components to process the data, the distribution panel or the switch gear needs to be configured so that they are wire-connected with the detection sensors included in each of the plurality of breakers. However, it is difficult to mount the detection sensors therein or really maintain and manage the detection sensors.

In addition, it is difficult to really configure the distribution panel while outputting signals by connecting with each of the branch breaker in a wired form in the state in which the small breaker such as the branch breaker of the distribution panel is disposed en masse.

Meanwhile, the electrical fire due to the contact defects has a lower frequency than the electrical fire due to other factors and thus, a technology development of detecting the contact defects has not been actively conducted. As a result, there is no technology for the prevention of the fire due to the contact defects. However, most of the electrical fires due to the contact defects are determined as other factors due to a difficulty in inspecting the electrical fires, which have low statistics. Therefore, the frequency of accidents due to the contact defects is estimated to be higher than the statistics.

In order to reduce the risk of electrical fire, electrical signal features of the contact defects are extracted. Based on the extracted features, the electrical fire can be prevented by taking prompt actions on electric facilities that may have greater risk of electrical fires.

Therefore, a need exists for a system of securing objective and scientific data by three-dimensional simulation and experiments for the contact defects and collecting symptoms of electrical fires based on the secured data to take appropriate actions.

DISCLOSURE

Technical Problem

Therefore, the present invention has been made in view of the above-mentioned problems, and an aspect of the present invention is to provide a remote electricity safety diagnosis system capable of enabling a server in a U-city integration information center to prevent electrical damage occurring within a U-city using a sensor monitoring an IT-based intelligent switch gear and intelligent distribution panel, surrounding environments, and the like, in electric facilities in a shopping mall, a house, an apartment, a public institution, and the like, that are configured in the U-city.

Another aspect of the present invention is to provide a remote electricity safety diagnosis system capable of enabling a server in a U-city integration information center to monitor and manage a state of a switch gear and a distribution panel mounted in a U-city environment and surrounding environments such as flooding, temperature, vibration, outlet connection defects, and the like, in real time and comprehensively diagnose electricity safety for electric facilities of the switch gear by detecting the arc and partial charge in the switch gear.

Another aspect of the present invention is to provide a remote electricity safety diagnosis system including a digital distribution panel having a function of storing data for various events such as leakage current, a switching on/off state of contacts of a breaker, and the like, by using a controller of the digital distribution panel and a function of transmitting data to an upper server.

Another aspect of the present invention is to provide a remote diagnosis system of a digital distribution panel or a switch gear provided with an SMPS configured to detect a magnitude in AC voltage as an isolated DC voltage signal.

Another aspect of the present invention is to provide a function of detecting non-contact arc and partial discharge, analyze a trend of arc data and partial discharge data, and provide a risk diagnosis index and short-term prediction trend, thereby preventing electricity safety accidents.

Another aspect of the present invention is to detect fine voltage according to contact resistance due to contact defects within an electric connector to prevent electrical fire due to the contact defects.

Another aspect of the present invention is to promptly inform of electrical fire due to contact defects within an electric connector to a central management center.

Another aspect of the present invention is to take appropriate actions according to situations within an electric connector by monitoring the inside of the electric connector in real time.

Technical Solution

In accordance with an aspect of the present invention, there is provided an electricity safety diagnosis system including: a digital switch gear detecting AC voltage or current of a power supply line with a sensor to diagnose arc or partial discharge in a detected waveform and store the diagnosed arc or partial discharge as diagnosis data and transmitting the diagnosis data to an upper server, so as to diagnose safety of electric facilities of a switch gear; and a digital distribution panel including a main breaker and a branch breaker and detecting AC voltage or current input through the power supply line and storing the detected AC voltage or current as detection data and transmitting the detection data to the upper server through wired and wireless communication.

Further, the digital switch gear may include: a data accumulation unit accumulating and storing arc data detected from a predetermined time in the sensor, an alarm comparison unit setting an alarm level of the arc or partial discharge through a comparator and generating an alarm at the time of exceeding the alarm level, and a trend analysis unit detecting and analyzing a generation frequency of the arc or partial discharge in the arc data accumulated of the data accumulation unit to generate and store the current trend or short-term prediction trend data.

In accordance with another aspect of the present invention, there is provided an apparatus for diagnosing electricity safety: an arc data detection unit sensing the arc occurring in the switch gear or the distribution panel and storing the sensed arc as the arc data; a data determination unit determining whether the arc data detected in the arc data detection unit exceeds a predetermined threshold level; and a first risk determination unit increasing a risk level when the arc data exceeds a threshold level from the arc data detected from the predetermined time and generating the alarm signal due to the arc occurrence when the risk level exceeds the predetermined alarm level.

The first risk determination unit may calculate the risk and analyze the arc generation trend by an on/off contact scheme or an analog linear signal detection scheme.

The electricity safety diagnosis system may further include a partial discharge diagnosis module determining the risk by detecting the partial discharge occurring in the switch gear or the distribution panel, wherein the partial discharge diagnosis module selects a frequency band other than frequency bands in which previously known noises are distributed to measure whether the partial discharge occurs.

The partial discharge diagnosis module may determine the detected signal as noise when the magnitude in the detected signal is the predetermined threshold level or less rather than being determined as the partial discharge.

The partial discharge diagnosis module may measure the partial discharge to generate a plurality of kinds of statistical parameters and use the statistical parameters to generate a risk diagnosis index for the partial discharge and analyze the risk due to the partial discharge.

The partial discharge diagnosis module may include: a partial discharge data generation unit measuring a discharge signal in the switch gear to generate the partial discharge data; a phase cascade array generation unit performing phi-q-n analysis for the partial discharge data to generate a phase cascade array; a statistical parameter generation unit using the phase cascade array to generate the plurality of kinds of statistical parameters; a risk diagnosis index generation unit receiving the statistical parameters and applying at least two kinds of algorithms to generate the risk diagnosis index due to the partial discharge; and a second risk determination unit analyzing the risk diagnosis index due to the partial discharge to determine the risk due to the partial discharge.

The generation of the risk diagnosis index due to the partial discharge may use an NN algorithm and an MDA algorithm to apply and generate a weight value to each of the NN algorithm and the MDA algorithm.

The electricity safety diagnosis system may further include a display unit mounted in the switch gear or the distribution panel indicating the trend and an alarm list of the arc generation or the partial discharge generation.

In accordance with another aspect of the present invention, there is provided an electricity safety diagnosis system applied to a U-city environment including: a digital switch gear detecting AC voltage/current of a power supply line and transmitting data to an upper server in wired and wireless communication while diagnosing and storing arc and partial discharge information in a detected waveform so as to diagnose safety of electricity facilities of a substation; and a digital distribution panel including a main breaker and a branch breaker and transmitting data to an upper server in wired and wireless communication while detecting and storing a AC voltage/current state input through a power supply line.

The digital switch gear may include: a voltage/current sensing module sensing AC voltage/current of the power supply line to detect data; a switch gear control module analyzing real-time data detected in the voltage/current sensing module by a diagnosis module to generate the diagnosis data and including input and output terminals to and from which a communication signal with contacts of a relay mounted in the switch gear is input and output; a sensor module detecting surrounding environments of the digital switch gear and outputting sensing data through a wireless network; a gateway module storing real-time data output from the switch gear control module and a sensing data output from the sensor module and transmitting the stored data to a remote server (upper server); an LCD module connected with the gateway module to directly confirm the diagnosis data and the sensing data transmitted from the gateway module at the outside; and an SMPS converting the AC current of the power supply line into the DC current to supply the converted DC current to the control module and gateway module of the switch gear.

The diagnosis module included in the control module of the switch gear may include: a data accumulation unit accumulating arc data detected for a setting time in the voltage/current sensing module; an alarm comparison unit setting a reference value of the arc and partial discharge by a comparator and generating an alarm at the time of exceeding the reference value; a trend analysis unit detecting an occurrence frequency of an arc and a partial discharge in the arc data accumulated in the data accumulation unit to analyze and store a current trend and a short-term prediction trend data; and a communication unit transmitting the current trend and the short term prediction trend data to the gateway module.

The digital distribution panel may include: a branch breaker to which a detection module detecting the voltage/current signal in the power supply line through a current transformer and a zero phase transformer mounted therein to output data converted into a digital form in the wireless communication is attached; a digital control module receiving data output from the detection module of the branch breaker as a wireless signal to detect a state of voltage/current and an ON/OFF state of the main breaker and the branch breaker and output the detection data; a sensor module detecting the surrounding environments of the digital distribution panel to output the sensing data through the wireless data; a gateway module storing the detection data output from the digital control module and the sensing data output from the sensor module and transmitting the stored data to the remote server; an LCD module connected with the gateway module to directly confirm the detection data and the sensing data transmitted from the gateway module at the outside; and an SMPS converting the AC current of the power supply line into the DC current and supplying the DC current to the gate digital control module and the gateway module.

The detection module of the branch breaker may include: a sensing resistor converting an AC current signal sensed in the current transformer or the zero current transformer into an AC voltage signal; an amplifier amplifying the AC voltage signal converted in the sensing resistor; a signal processing module resistor detecting a state of the AC voltage signal amplified through the amplifier; a root mean square value transformer transforming the phase processed AC voltage signal subjected to the signal processing through the signal processing module into a root mean square value of the DC voltage; an AD converter converting the DC voltage converted in the root mean square value converter into an root mean square value resistance digital signal; a power supply side photocoupler sensing a power supply state of a power supply side by receiving a signal output from a light-emitting diode connected with the power supply side terminal line of the branch breaker to receive power supply resistance of the power supply side and a terminal of a transistor conducted when the diode emits light; and a load side photo coupler sensing a power supply state of a load side by receiving a signal from a light-emitting diode connected with the load side terminal line of the branch breaker to receive power supply resistance of the load side and a terminal of a transistor conducted when the diode emits light; a phase of the power signal receiving a signal output from a signal received on the phase of the power supply signal; a control unit sensing the power signal of the power supply side and the load side in the signal received on the phase of the power signal; a digital signal device amplifying the digital signal converted in the AD converter and the controller; and an RF communication unit transmitting a digital signal input to the digital input and output device in wireless communication.

The digital control module may include a microprocessor controlling the branch breaker while compensating and determining a digital signal received in wireless communication through the RF communication unit.

The digital input and output device may be configured to output a digital force trip signal according to the current and voltage state determined through the microprocessor, convert the force trip signal into the analog signal through the controller to be output through the power supply input and output terminals and penetrate through the zero current transformer of the branch breaker.

The SMPS may include a peak voltage sensing unit converting a highest value of the AC voltage input by performing full wave rectification on a primary commercial power supply into a DC value to generate a signal so as to sense a magnitude in AC voltage and output in the DC voltage form; a triangular wave oscillator oscillating a triangular wave comparing with the magnitude in the DC value of the peak voltage sensing unit; a comparator unit generating a square wave while performing a switching operation by comparing the magnitude in the DC value of the peak voltage sensing unit with the triangular wave; an isolation and signal transfer unit including a photocoupler turned-on when the square wave is generated in the comparator unit and transferring the square wave to the secondary side; and a smoothing and adjusting unit converting the square signal transferred through the isolation and signal transfer unit into the DC value.

The sensor module may be configured to include a thermal sensing sensor, a smoke sensor, a flooding sensor, a vibration sensor, and outlet contact defect detection sensor and to transmit the detected signals to the gateway module in a Zigbee wireless communication scheme.

The outlet contact defect detection sensor may include: a voltage detection unit detecting the voltage of the outlet; an amplification unit amplifying a signal waveform output from the voltage detection unit; a reference voltage generation unit generating reference voltage to the voltage state of the contact defects of the voltage detection unit; a comparator determining a voltage amount increased by comparing the output signal of the amplification unit with the output; and a communication unit digitalizing the increased voltage amount determined in the comparator and transmitting the digitalized voltage amount to the gateway module.

In accordance with another aspect of the present invention, there is provided an apparatus for detecting contact defects within an electric connector including: a voltage detection unit connected to an electric connector to detect and output voltage according to an increase in contact resistance; an amplification unit amplifying and outputting the voltage input from the voltage detection unit; a comparison unit comparing the voltage input from the amplification unit with the received reference voltage to output a voltage change amount; and a communication unit transmitting data digitalizing the voltage change amount input from the comparison unit to the outside, wherein the apparatus for detecting contact defects is received with the power from the AC power supply connected with the electric connector.

In accordance with another embodiment of the present invention, there is provided an apparatus for detecting contact defects within an electric connector including: a voltage detection unit connected with an electric connector to detect and output voltage according to an increase in contact resistance; an amplification unit amplifying and outputting voltage input from the voltage detection unit; a comparison unit comparing the voltage input from the amplification unit with the received reference voltage to output a voltage change amount; and a communication unit transmitting data digitalizing the voltage change amount input from the comparator to the outside using a communication channel that does not overlap with a communication channel used in a group of the apparatuses for detecting adjacent contact defects.

In accordance with another embodiment of the present invention, there is provided a method for detecting contact defects within an electric connector including: (a) supplying power from an AC power supply connected with the electric connector and detecting and amplifying voltage according to an increase in contact resistance of the electric connector or a power plug; (b) comparing the amplified voltage with the set reference voltage; and (c) converting the compared voltage change amount into a digital signal and then transmitting and informing of it to a remote place through the communication channel.

Advantageous Effects

The remote diagnosis system mounted in the digital distribution panel or the switch gear according to the present invention can obtain the following effects.

First, the signals for the overcurrent, the leakage current, the overvoltage, the state of the breaker, or the like, can be extracted through the detection module and the digital control module of the branch breaker that is provided with the detection module mounted in the digital distribution panel according to the present invention and can be digitalized so as to be transmitted to the remote server while being stored through the gateway module, thereby preventing the electrical fire by enabling a user to promptly take actions in response to the electric facilities that may cause the electrical fire and all the extracted data can be stored in a black box of the gateway module to secure the objective and scientific data regarding the arc, the overcurrent, the overvoltage, the leakage current, and the like, even though the electrical fire occurs and thus, the remote diagnosis system mounted in the digital distribution panel or the switch gear capable of analyzing the factors of the electrical fire and appropriately taking an action based on the secured data can be built.

Second, the SMPS mounted in the digital distribution panel or the switch gear of the remote diagnosis system according to the present invention can sense the magnitude in AC voltage as the electrically isolated DC voltage to enable the users to easily and variously configure the circuits when handling the digital control of the digital distribution panel or the switch gear that is electrically isolated from the AC voltage terminal.

Third, the harmful electricity safety environment factors detected through the sensor module of the remote diagnosis system mounted in the digital distribution panel or the switch gear according to the present invention can be stored through the gateway module and transmitted to the remote server so as to be managed by a centralized control scheme.

Fourth, the embodiment of present invention can transmit the signal data detected through the sensor in the detection module mounted in the branch breaker of the distribution panel according to the present invention to transmit data in wireless communication and does not require additional equipment such as the separate microswitch, or the like, and can remotely monitor the supply of power and the wiring state of the breaker while solving the complicated problems associated with wired communication.

Fifth, the embodiment of the present invention can provide the function of detecting non-contact arc and partial discharge, analyze the trend of arc data and partial discharge data, and provide the risk diagnosis index and short-term prediction trend, thereby preventing the electricity safety accidents.

Further, the embodiment of the present invention can prevent the occurrence of electrical fires with the increase in contact resistance by detecting the fine voltage according to the contact resistance occurring due to the connection defects of the electric connector or the power plug and generate the alarm sound, if necessary, thereby preventing the electrical fire.

In addition, the embodiment of the present invention can accurately detect the contact resistance within the electric connector in real time to prevent the fire due to the contact defects of the electric connector and promptly inform of the occurrence of fire to the management center, thereby protecting the lives and property from the risk of fire.

The embodiment of the present invention can detachably mount the temperature sensor in the electric connector if necessary to detect the fire using the contact resistance and sense the temperature within the electric connector to detect the fire, thereby accurately and promptly confirming whether the fire occurs.

BRIEF DESCRIPTION OF THE DRAWINGS

The foregoing and other objects, features and advantages of the present invention will become more apparent from the following detailed description when taken in conjunction with the accompanying drawings in which.

BEST MODE

Hereinafter, a remote electricity safety diagnosis system mounted in a digital distribution panel or a switch gear according to the present invention will be described in detail with reference to the accompanying drawings.

Figure 1:
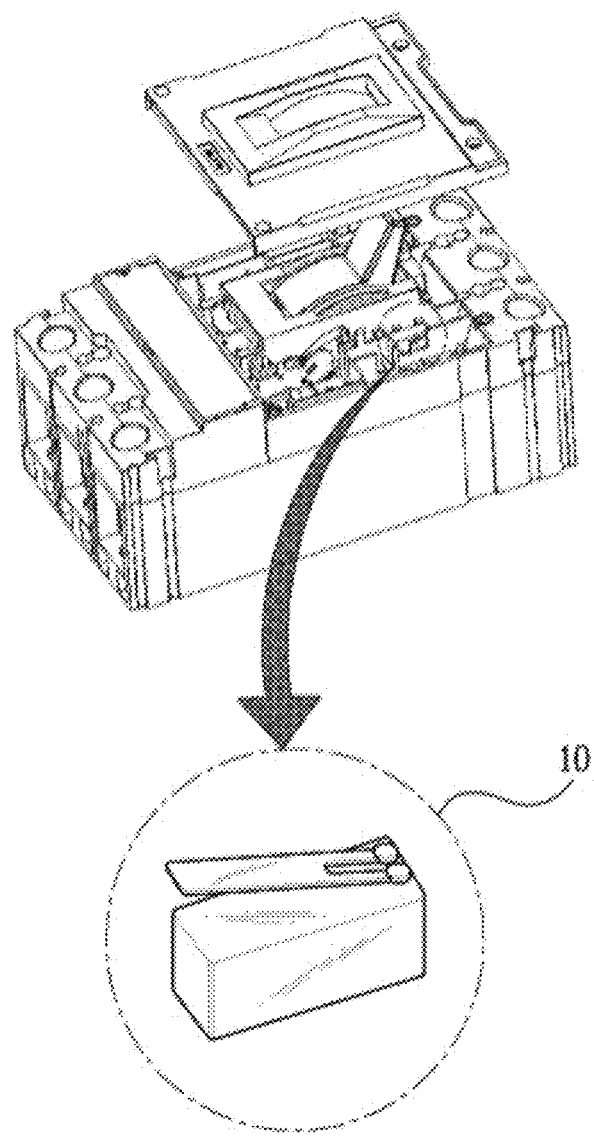
FIG. 1 is a configuration diagram of a three-phase circuit breaker in which a microswitch for detecting a power supply state mounted in a conventional distribution panel is mounted.
Figure 2:
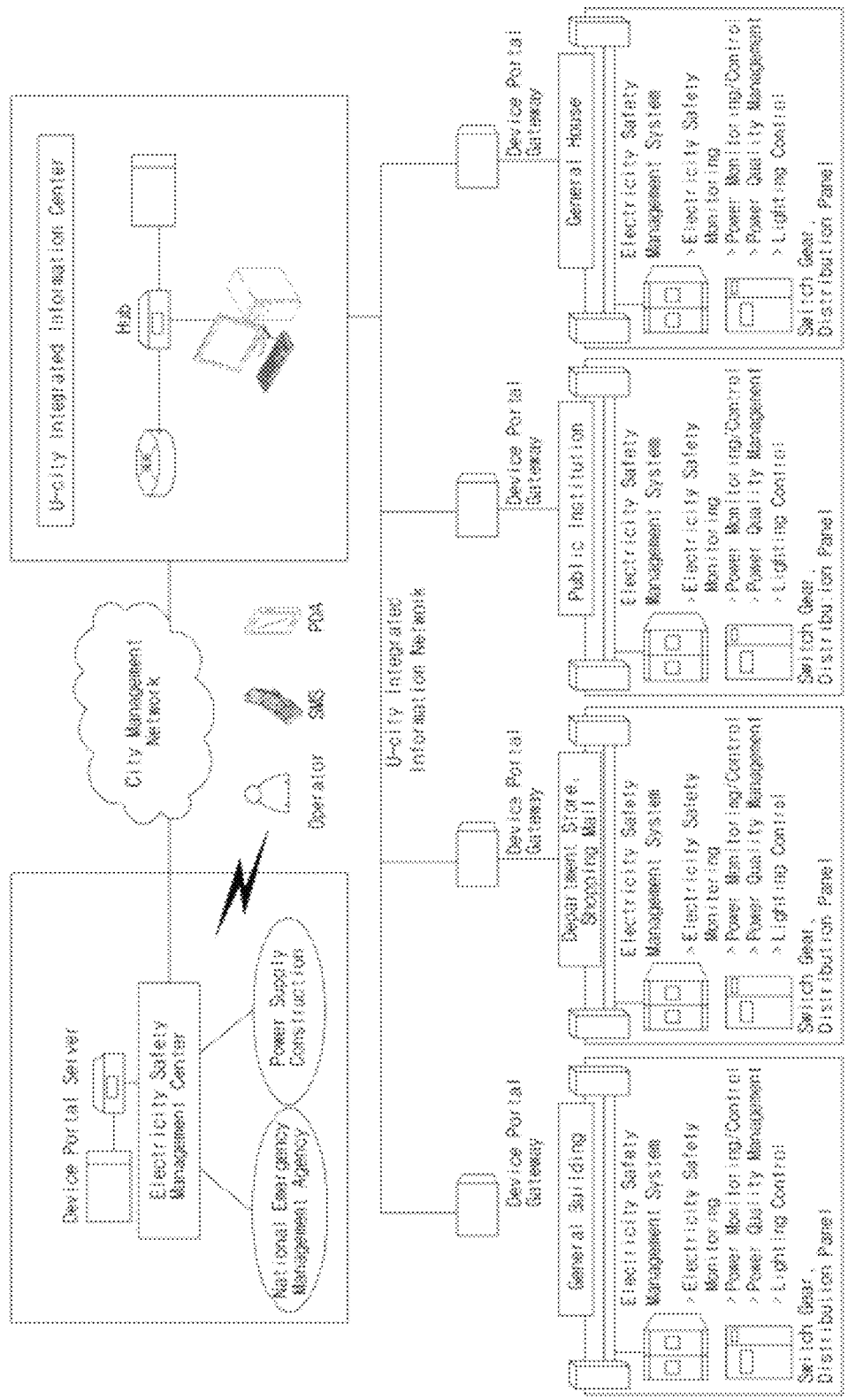
FIG. 2 is a configuration diagram of a U-city electricity safety diagnosis system having a remote diagnosis system.

FIG. 2 is a configuration diagram of a U-city electricity safety diagnosis system having a remote diagnosis system.

As shown, the remote electricity diagnosis system according to the present invention includes a digital switch gear including components to transmit data to an upper server in wireless communication, that is, a server in a U-city integration information center while detecting arc and partial discharge signals with a non-contact arc sensor and a partial discharge sensor and managing and storing the arc and partial discharge in the detected waveform so as to manage safety of electric facilities of a substation.

Further, the remote electricity diagnosis system includes a digital distribution panel including a main breaker and a branch breaker to transmit data to the upper server in wireless communication while detecting and storing a state of AC voltage/current input through a power supply line.

Figure 3:
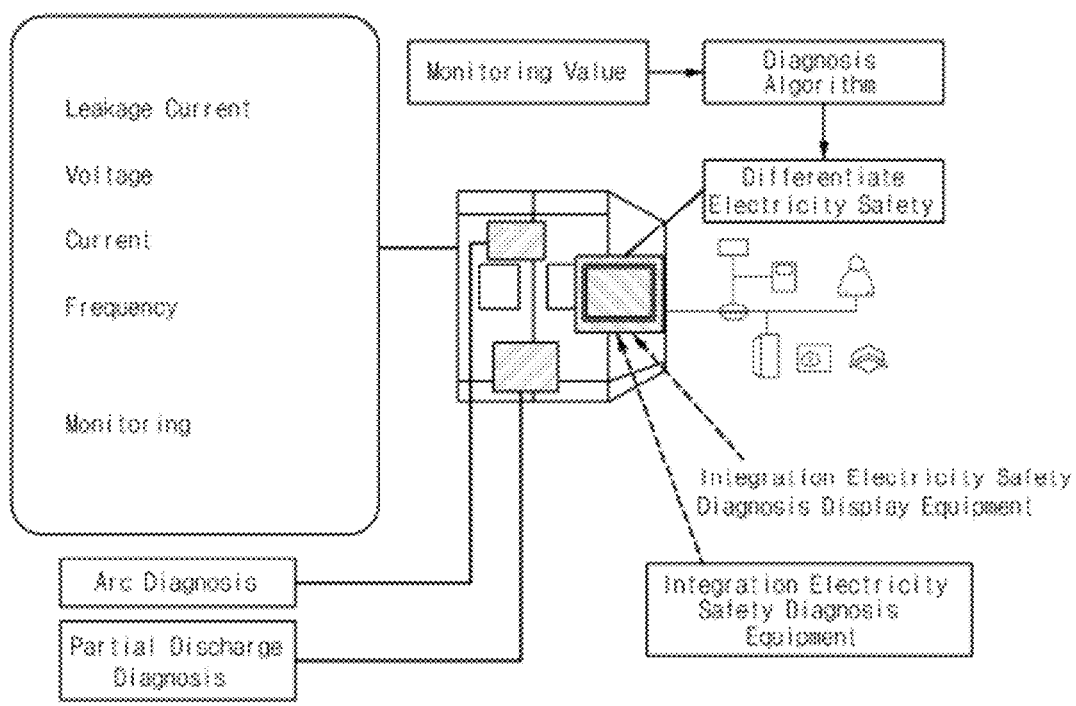
FIG. 3 is a configuration diagram of a remote electricity safety management system according to the present invention.

FIG. 3 is a configuration diagram of a remote electricity safety management system according to the present invention.

The digital switch gear monitors data on whether an arc occurs in leakage current, voltage, frequency, and current waveforms detected by an arc measuring sensor and data on the partial discharge so as to manage safety of electric facilities within the switch gear and analyzes the monitored data by a management algorithm so as to determine electricity safety, thereby preventing electrical accidents of the switch gear receiving and distributing power and thus, preventing outage.

Further, the switch gear is provided with an LCD screen for managing electricity safety so as to confirm the analyzed data on the spot and transmits electrical information of the switch gear and the analyzed arc occurrence and partial discharge diagnosis data to the server in the U-city integration information center that is the upper server.

Figure 4:
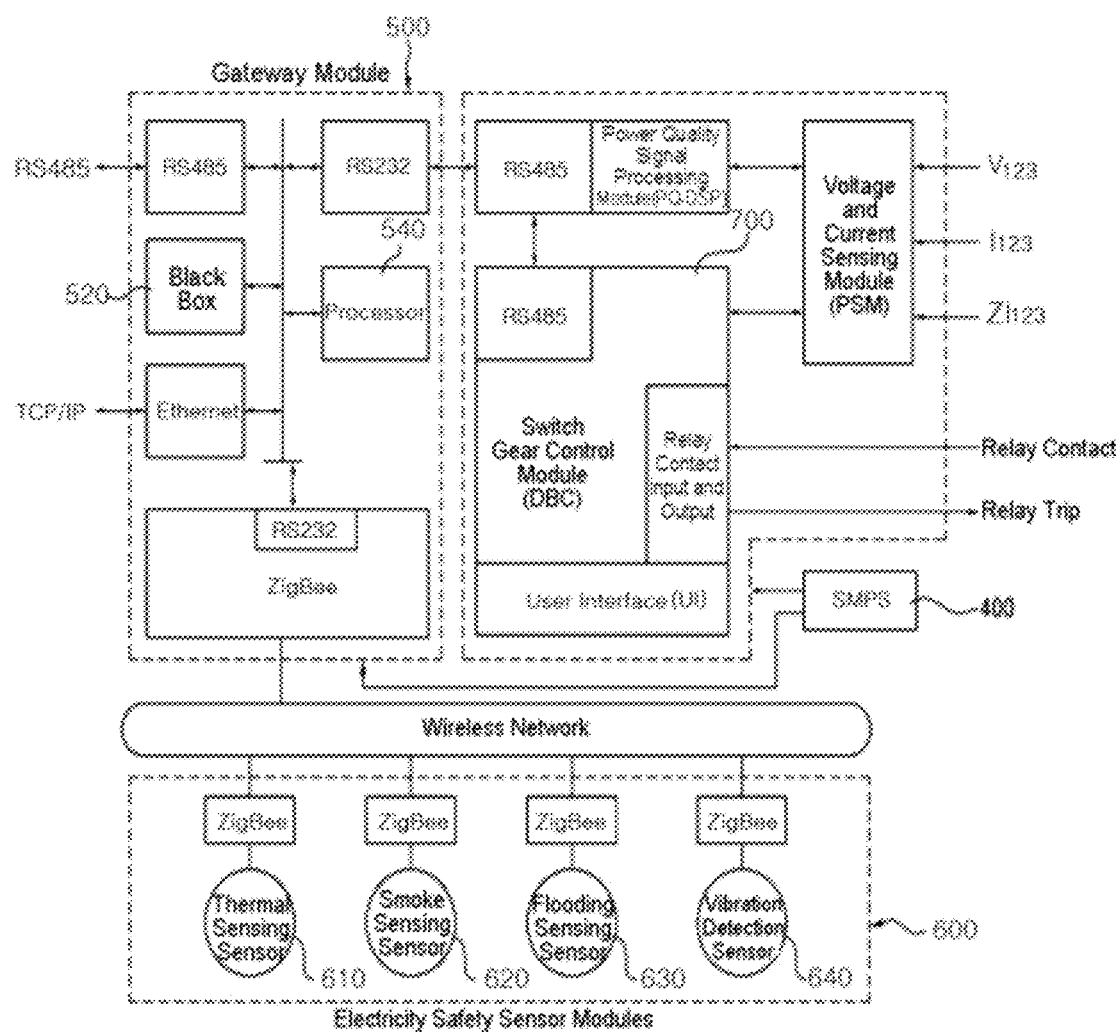
FIG. 4 is an internal configuration diagram of the remote electricity safety diagnosis system according to the present invention.

FIG. 4 is an internal configuration diagram of the remote electricity safety diagnosis system according to the present invention. The digital switch gear according to the present invention includes a voltage/current sensing module that senses the AC voltage/current of the power supply line to detect data.

As shown, a switch gear control module 700 includes input and output terminals that analyze real-time data, which are detected by the voltage/current sensing module, by a diagnosis module to generate the diagnosis data and input and output communication signals with contacts of a relay mounted in the switch gear.

Therefore, the switch gear control module 700 is configured to turn-on/off the relay while communicating with the contacts of the relay including a magnetic switch or a magnetic circuit breaker through the input and output terminals.

A sensor module 600 shown is provided with a plurality of sensors, which detects surrounding environments of the digital switch gear to output sensing data through a wireless network.

A gateway module 500 shown transmits data to the remote server while receiving and storing the real-time data output from the switch gear control module 700 and the sensing data output from the sensor module 600. Further, the LCD module is connected with the gateway module 50 to directly confirm the diagnosis data and the sensing data transmitted from the gateway module at the outside.

Further, the switch gear according to the present invention includes an SMPS that converts AC voltage of the power supply line into DC voltage and supplies the DC voltage to the switch gear control module and the gateway module.

Figure 5:
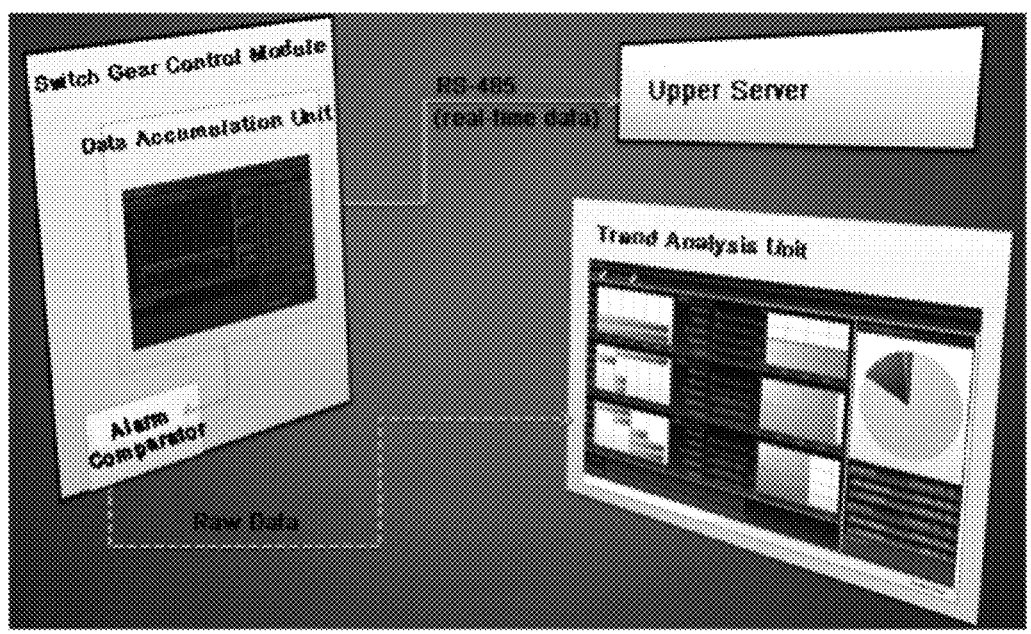
FIGS. 5 and 6 are operating configuration diagrams of a switch gear control module of the remote electricity safety diagnosis system according to the present invention.
Figure 6:
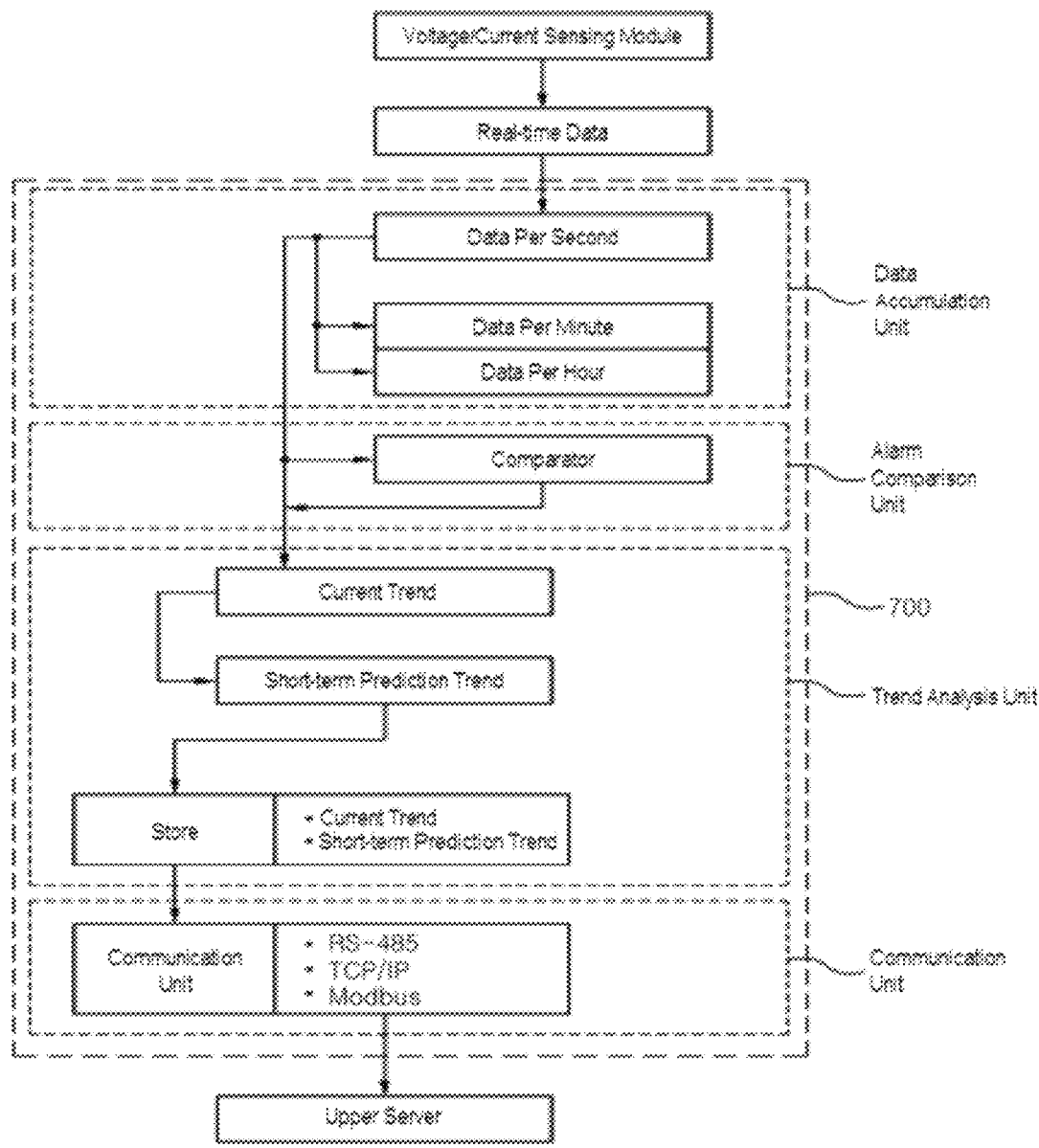

FIGS. 5 and 6 are operating configuration diagrams of the switch gear control module of the remote electricity safety diagnosis system according to the present invention.

As shown, the diagnosis module included in the control module of the switch gear is configured to include a data analysis unit, an alarm comparison unit, a trend analysis unit, and a communication unit.

A data accumulation unit may accumulate the arc data detected for a setting time in the voltage/current sensing module and accumulate the arc data detected for the setting time as a data value per second, an average value of a signal per second generated for 1 minute, or an average value of a signal per second for 1 hour.

The alarm comparison unit sets an alarm level of the arc and partial discharge in the arc data accumulated in the data accumulation unit by a comparator to generate an alarm at the time of exceeding the alarm level.

The trend analysis unit detects an occurrence frequency of arc and partial discharge to analyze and store current trend and short-term prediction trend data through a neural network algorithm.

The communication unit is configured to transmit the current trend and short-term prediction trend data to the gateway module as the diagnosis data through RS-232, TCP-IP, Modbus, and the like, and inform of a risk of a current state to the upper server through the gateway module receiving the diagnosis data.

The arc detection of the switch gear according to another embodiment of the present invention uses photo sensing so as to be detected by an electrical non-contact scheme. The arc detection and the arc detection trend analysis through the photo sensing may be performed by an on/off contact scheme or an analog linear signal detection scheme that are embodiments to be described below.

First, describing the on-off contact scheme, when light exceeding a threshold level is incident to a sensor, it is configured to generate an on signal and is determined whether an on-state duration in which the on signal is maintained is generated within reference duration. When the on signal is generated, a parameter value (risk) determining the arc occurrence is accumulatively increased and when the on signal is not generated within the reference duration, the parameter value determining the arc occurrence is decreased. When the parameter value determining the arc occurrence exceeds a predetermined threshold value (alarm level), the on-off contact scheme determines that the arc of the risk level occurs, thereby generating the alarm signal.

Figure 7:
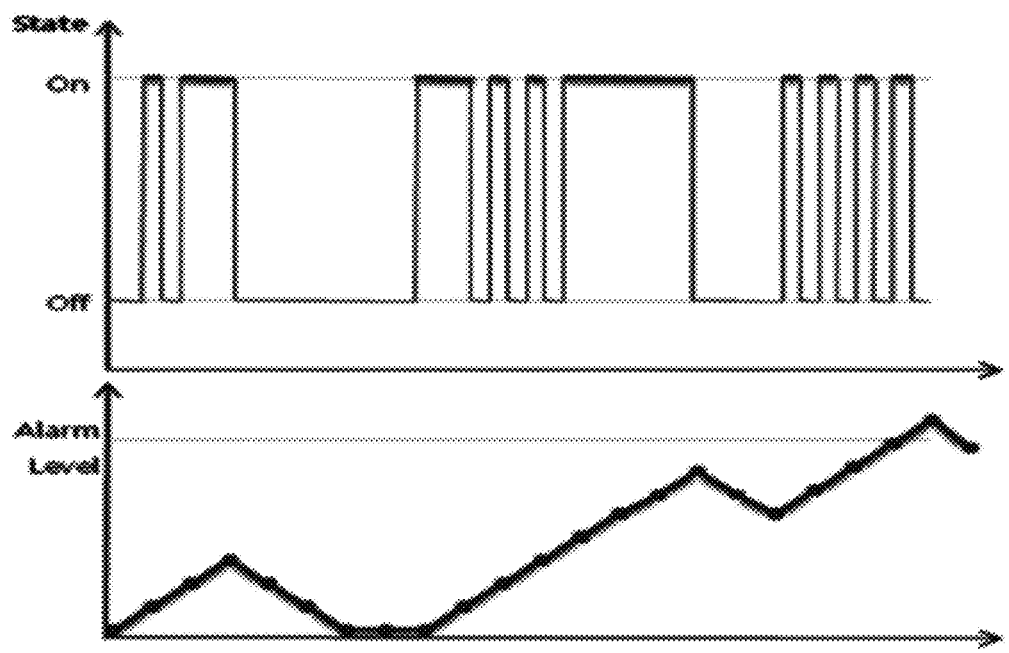
FIG. 7 is a diagram showing a method for detecting arc data by a switching-on/off scheme in a digital switch gear according to the present invention.

This will be described in detail with reference to FIG. 7. As shown in FIG. 7, the on-off contact scheme maintains the off state when the arc does not occur and maintains the on state during the arc occurrence when the arc occurs. It is preferable to differentiate on/off according to whether the intensity of light input to the arc sensor exceeds the predetermined threshold level and it is preferable to continuously output the on state for time when light exceeding the threshold value is continuously output/input. The diagnosis module of the switch gear determines whether the on signal is generated for a predetermined duration to input an arc data (Ls) value measured at the current duration as 1 when the on signal is generated at the corresponding period and input an arc data (Ls) value measured at the current duration as −1 when the on signal is not generated at the corresponding period.

The diagnosis module accumulates an arc signal level measured by the arc sensor for each period to calculate a risk data (Li) value for determining the risk.

The risk data (Li) value may be preferably calculated by the following Equation.

$$L_i = L_p + a \times L_s \qquad \text{Equation 1}$$

Here, $L_i$ represents the risk data, $L_p$ represents the arc data measured and accumulated up to a past (n−i) time, $L_s$ represents the arc data measured at a current (n) time, and a is a compensation coefficient (weight). The compensation coefficient a may be preferably set to 1.0 or 1.2 and can be controlled according to the environment in which the switch gear is mounted.

The arc data ($L_i$) value accumulated for calculating the alarm level may be output in a form in which the values are continuous, the alarm level may be set in consideration of the environment in which the switch gear is mounted and the alarm may be generated when the $L_i$ value exceeding the threshold value is generated.

Next, the analog linear signal detection scheme is a scheme to implement a circuit of linearly representing the magnitude in the arc signal and to output a value in linear proportion to the intensity of the input arc signal.

Figure 8:
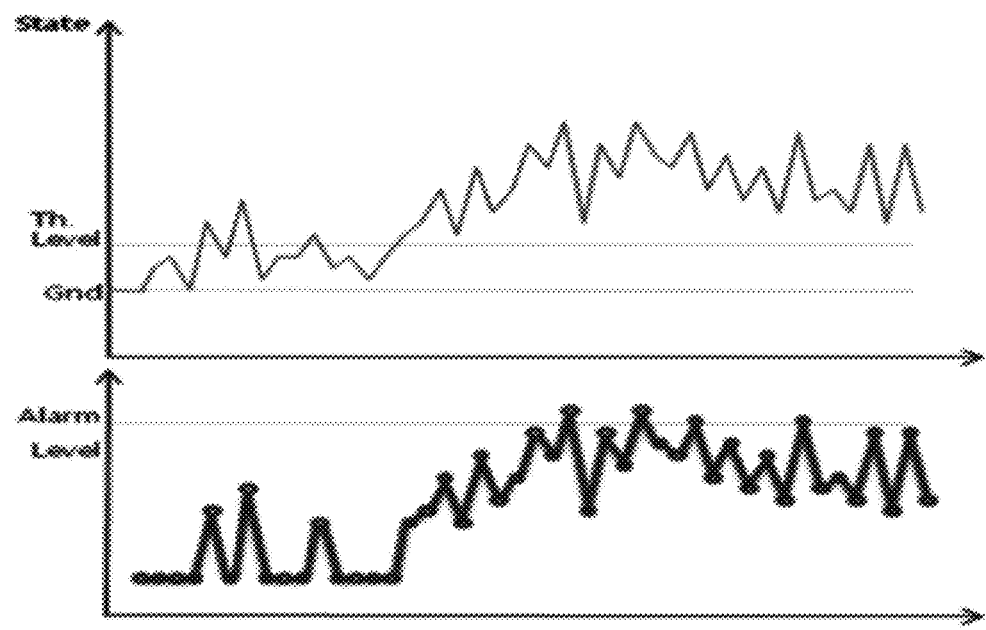
FIG. 8 is a diagram showing the method for detecting arc data by an analog linear signal detection scheme in the digital switch gear according to the present invention.

As shown in FIG. 8, only the signal having a magnitude exceeding the threshold level is filtered so as to exclude a white noise component by the linear signal detection scheme. That is, a value less than the threshold level among the detected signals is disregarded and the arc data $L_i$ value linearly accumulated is calculated for only the signal exceeding the threshold level.

The calculation of the arc data by the linear signal detection scheme may be preferably obtained by the following Equation. This is calculated by adding a value obtained by multiplying a weight by the instantaneous change rate as the current detected value from the previously detected value among the continuously measured output values.

$$L_i = L_p + \frac{d}{dx} L_s \qquad \text{Equation 2}$$

Here, $L_i$ represents a totally accumulated arc data, $L_p$ represents the arc data measured and accumulated up to a past time, $L_s$ represents the arc data measured at a current time, a is a compensation coefficient (weight), $$\frac{d}{dx} L_s$$

represents a differential value of the $L_s$, and the compensation coefficient a may be preferably set to 1.0 or 1.2 and can be controlled according to the environment in which the switch gear is mounted.

Meanwhile, the diagnosis module may analyze a trend of the arc data through the accumulated arc data and may set a new alarm level based on the analyzed trend. Alternatively, the new alarm level may be directly set by the user managing the switch gear.

Hereinafter, the detection and diagnosis of the partial discharge according to the present invention will be described in detail.

Generally, the electromagnetic wave noise is variously distributed in the surrounding environments of the switch gear.

In order to accurately diagnose the partial discharge, there is a need to differentiate the change in signal due to the noise and the partial discharge. In order to avoid the band in which a significant amount of electromagnetic wave noise is present, the detection of the partial discharge according to the present invention is performed by selecting a band other than a portion of the noise band known in 300 MHz and 1 GHz bands.

Figure 9:
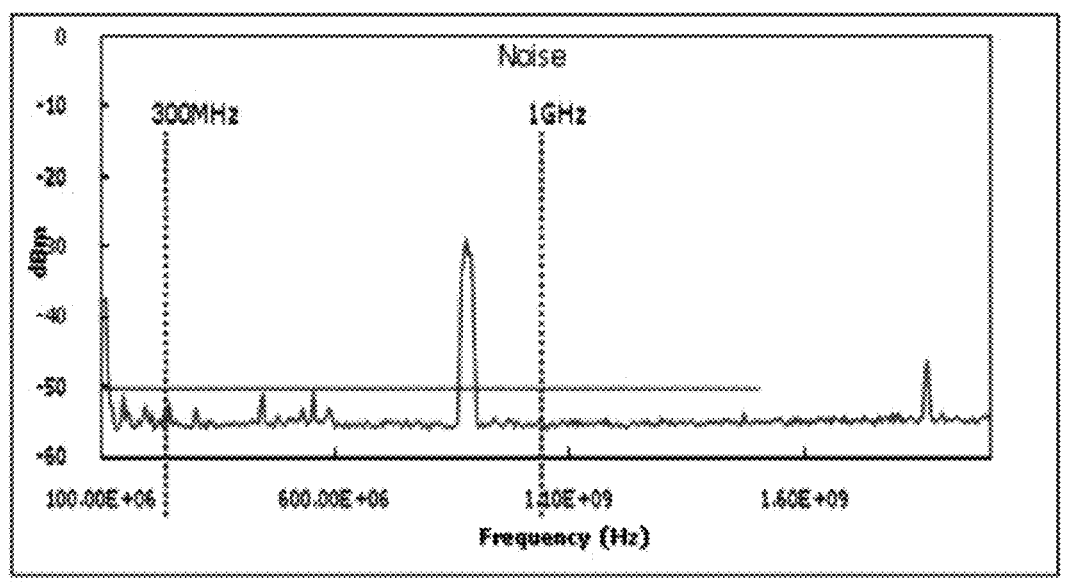
FIG. 9 is a diagram showing electromagnetic noises that are distributed in several frequency bands at the time of detecting partial discharge in the digital switch gear according to the present invention.

FIG. 9 shows an example of a noise signal measured in a place in which the switch gear is mounted. As shown in FIG. 9, the diagnosis regarding the partial discharge is performed by measuring the noise signal in a place where the switch gear is mounted to filter a band such as a use frequency band of the already known portable phone and selecting a band having a relatively smaller noise magnitude.

Further, the case in which the magnitude in noise is less than the threshold level is determined as a case in which the discharge is not the partial discharge, thereby performing the filtering. It is determined whether the partial discharge is performed on the signal level exceeding the threshold level.

Figure 10:
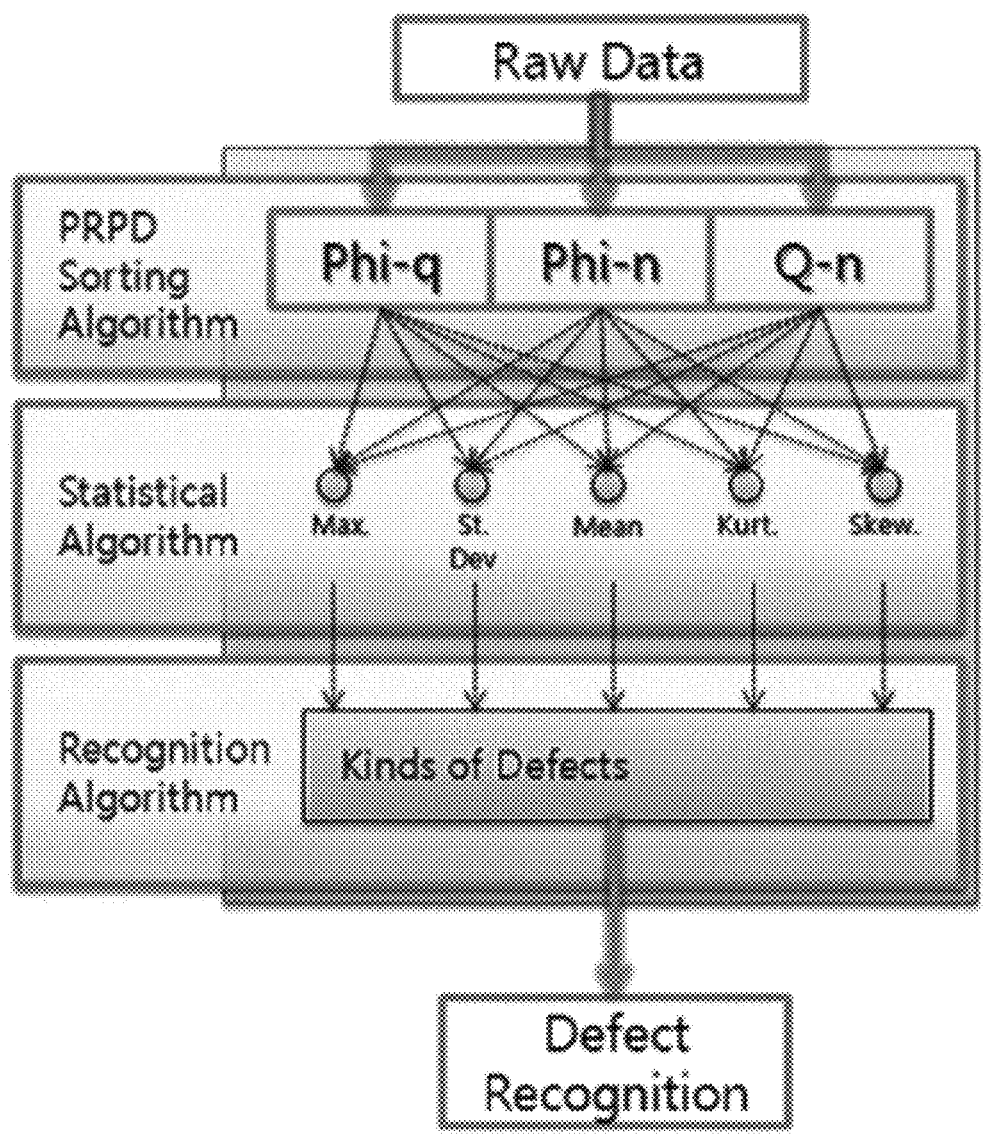
FIG. 10 is a flow chart showing the method for detecting partial discharge in the digital switch gear according to the present invention.

FIG. 10 is a flow chart showing a partial discharge diagnosis algorithm performed by the partial discharge diagnosis module.

When the partial discharge such as, for example, air corona is generated in the switch gear, the partial discharge diagnosis module measures the discharge signal generated in the air corona.

The discharge signal is acquired by the partial discharge diagnosis module in the form of the phase cascade data such as raw data. With respect to this, when the partial discharge diagnosis module performs Phi-q-n analysis, the phase cascade array such as phi-q data, phi-n data, and Q-n data as shown in FIG. 10 can be acquired and the correlation among phi, q, and n is analyzed. Herein, the phi represents the phase of the partial discharge generation signal, the q represents a discharge amount, and n represents the pulse generation number at the phase corresponding to the generation signal.

Next, the partial discharge diagnosis module calculates parameters such as Max, StDev, Mean, Kurt, Skew using the obtained phase cascade array. Herein, Max represents the maximum value among the input data, StDev represents the standard deviation, Mean represents an average, Skew represents skewness, and Kurt represents kurtosis. The detailed method of calculating the skewness and the kurtosis is represented by the following Equations 3 and 4.

$$\frac{n}{(n-1)(n-2)} \sum \left(\frac{x_i - \bar{x}}{s}\right)^3 \qquad \text{Equation 3}$$

Herein, n represents a sample size.
$x_i$ represents an input sample.
$\bar{x}$ represents a sample average and s represents the standard deviation.

$$\left\{\frac{n(n+1)}{(n-1)(n-2)(n-3)} \sum \left(\frac{x_i - \bar{x}}{s}\right)^4\right\} - \frac{3(n-1)^2}{(n-2)(n-3)} \qquad \text{Equation 4}$$

Herein, n represents a sample size,
$x_i$ represents an input sample, and
$\bar{x}$ represents a sample average and s represents the standard deviation.

The maximum value is a value calculated so as to minimize the effects of noise and abnormal signals and the maximum values among the input values are calculated and a portion of the maximum values is discarded.

The skewness is represented by a numerical value representing a skewed degree by comparing the distribution of the signal waveform with the normal distribution and the kurtosis is a parameter represented by a numerical value representing a kurtosis by comparing the distribution of the signal waveform with the normal distribution.

Figure 11:
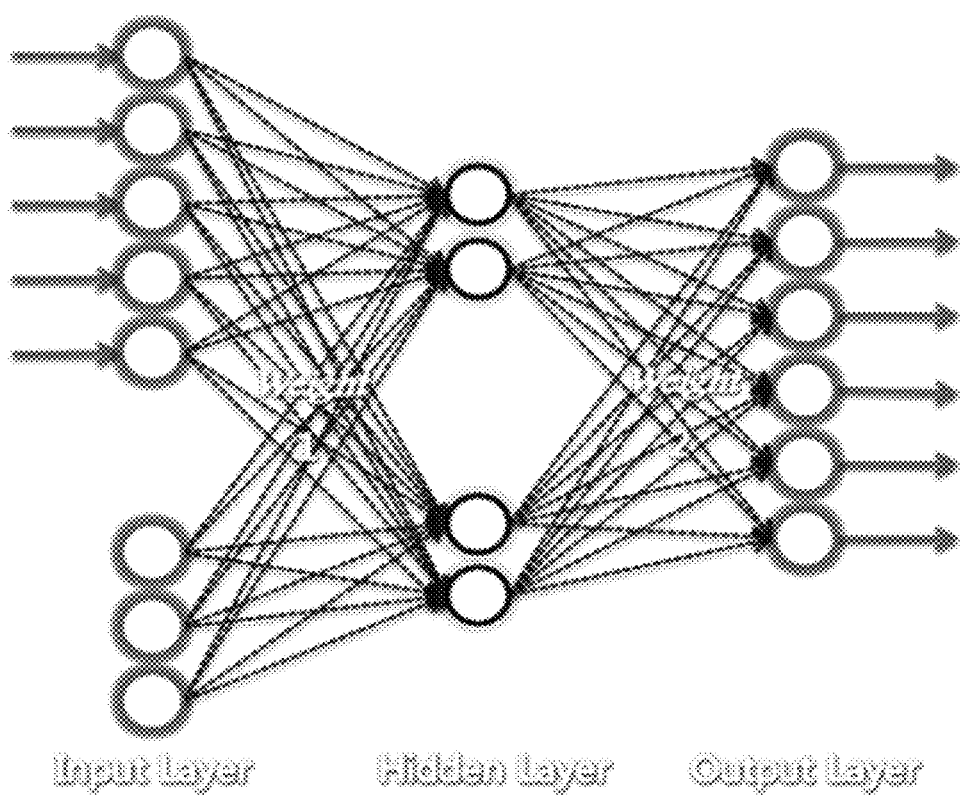
FIG. 11 is a diagram showing a conceptual diagram of an NN algorithm.
Figure 12:
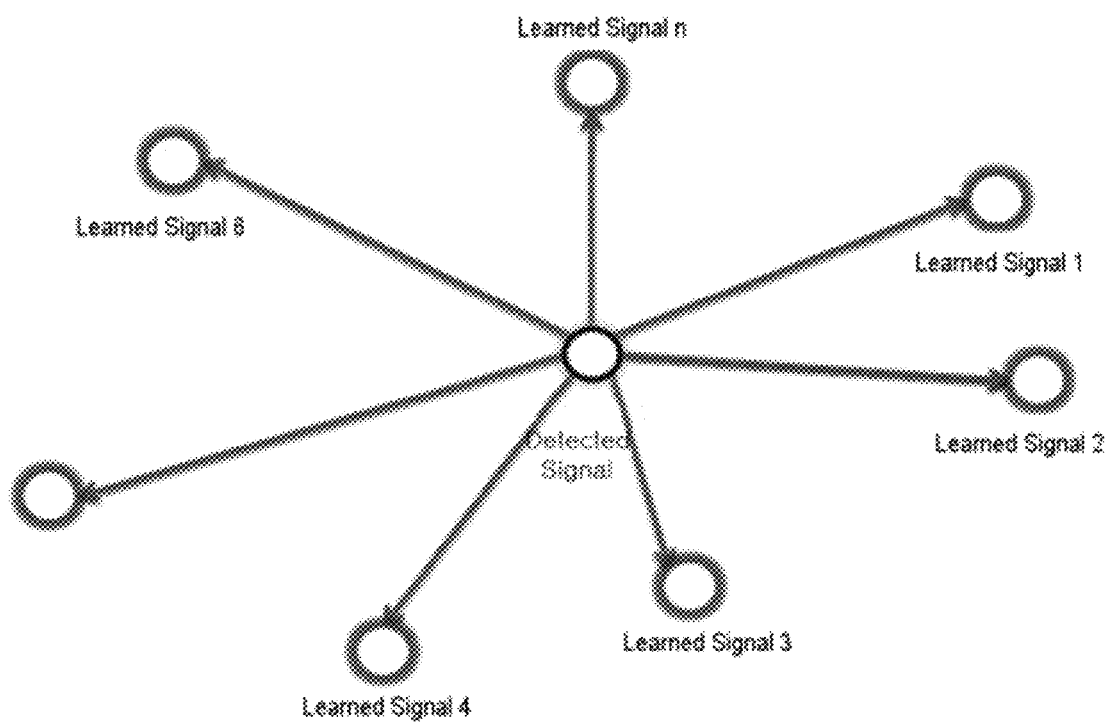
FIG. 12 is a diagram showing a conceptual diagram of an MDA algorithm.

Next, when the above-mentioned five parameters are calculated, the neural network (NN) algorithm and the minimum distance algorithm (MDA) are simultaneously applied to improve the reliability in recognition of a rate of the partial discharge diagnosis. The plurality of result values are calculated by the NN algorithm and the MDA algorithm to obtain an arithmetic average of the calculated results and the results may be calculated by allocating different weights to the results of the NN and the MDA. Another method first calculates the results by the NN and then, the MDA method can also be used as the method for supplementing weakness by the NN results. The conceptual diagrams of the NN and the MDA algorithms are shown in FIGS. 11 and 12, respectively. The contents for the NN algorithm and the MDA algorithm, respectively, are known and therefore, the detailed contents thereof will be omitted.

Meanwhile, the display unit mounted in the switch gear may largely include three functions.

First, a first display unit shows a current safety state, an analysis state, or the like, and shows the instantaneous value and the trend of the arc generation amount and the partial discharge generation amount. Further, the alarm information including a time at which the alarm is generated is displayed in a form of the alarm list.

A second display unit integrates the data transferred through Rs485 and TcP/IP with other measuring factors to comprehensively display the state of the current switch gear, or the like.

Figure 13:
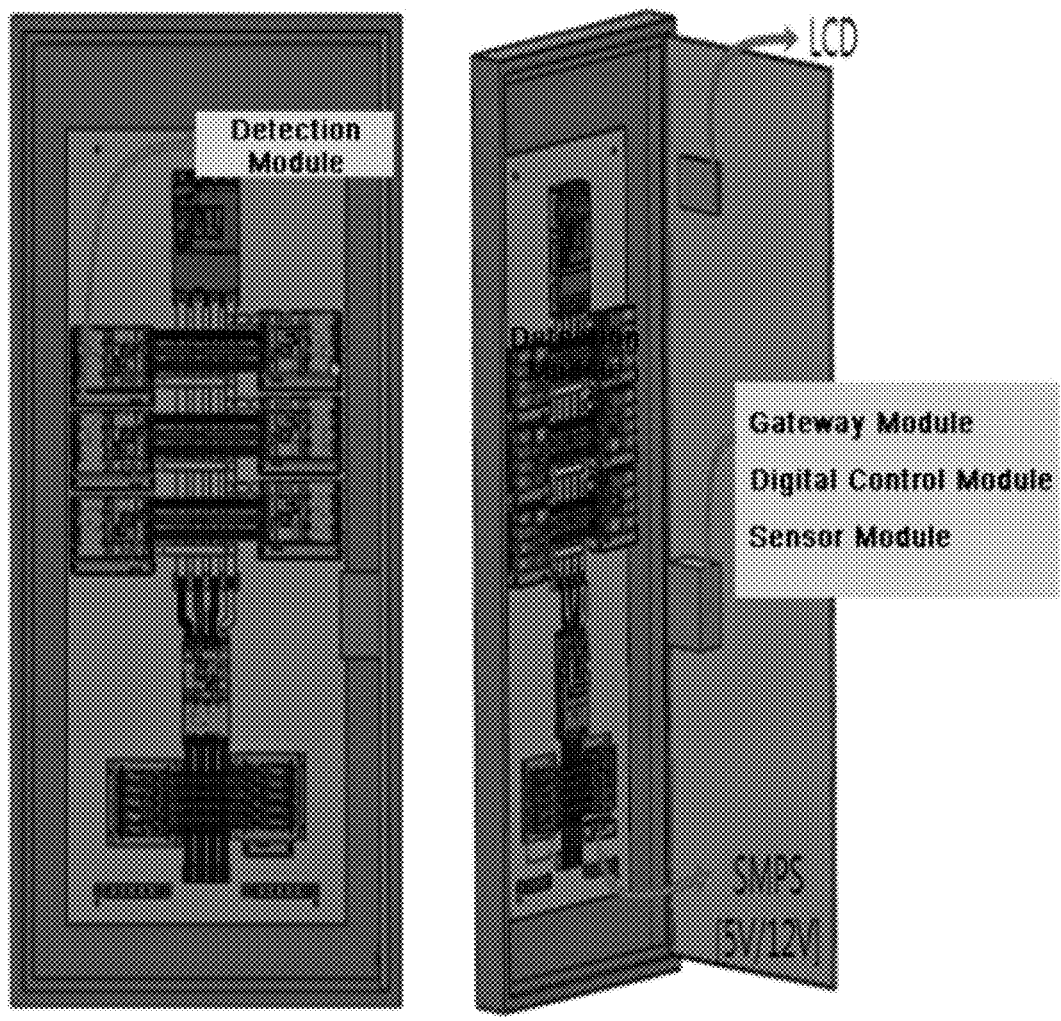
FIG. 13 is a configuration diagram of the remote electricity safety management system according to the present invention.
Figure 14:
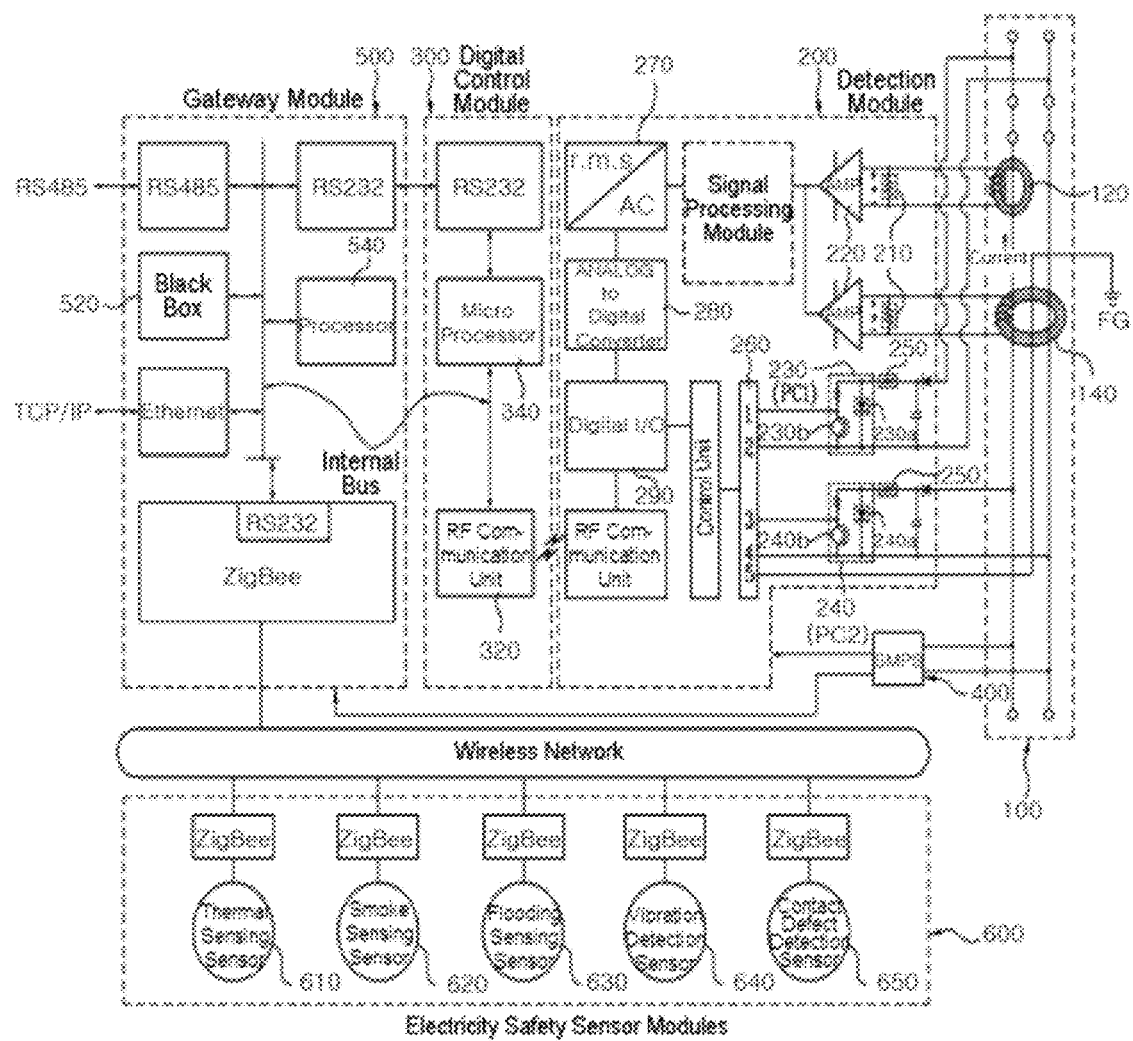
FIG. 14 is an internal configuration diagram of the remote electricity safety management system according to the present invention.
Figures 15, 16:
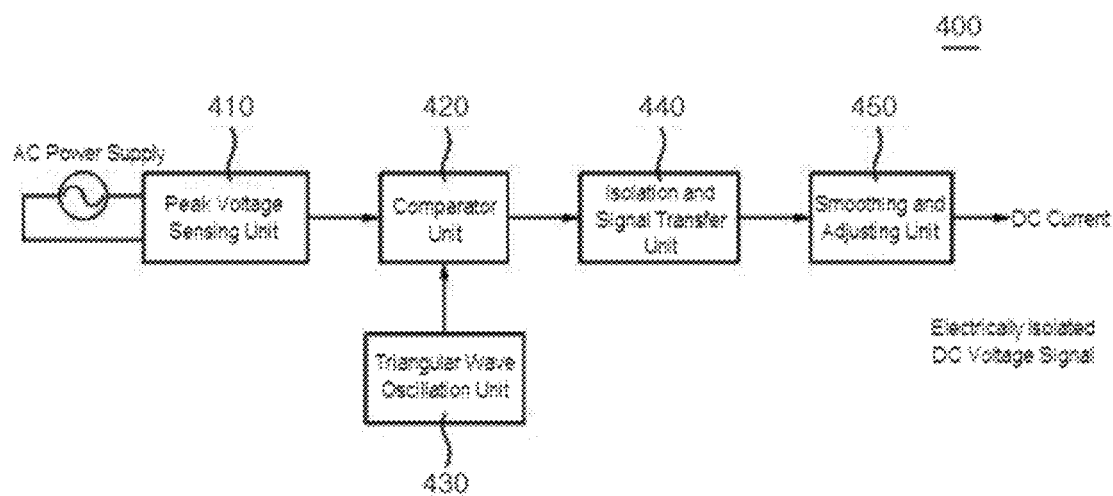
FIG. 15 is a diagram showing a case in which the power supply state of a branch breaker mounted in the digital distribution panel according to the present invention is formed in a data form.
FIG. 16 is a block diagram of an isolated SMPS using a photocoupler in the remote electricity safety diagnosis system according to the present invention.

A third display unit is used to receive the Raw Data through the TcP/IP and perform the analysis when remote monitoring is not easy or the analysis is needed by directly receiving the data in the field, for the reason of the construction of the communication network in the field FIG. 13 is a configuration diagram of the remote electricity safety diagnosis system according to the present invention, FIG. 14 is an internal configuration diagram of the remote electricity safety diagnosis system according to the present invention, and FIG. 15 is a diagram showing a case in which the power supply state of a branch breaker mounted in the digital distribution panel according to the present invention is formed in a data form.

As shown in FIGS. 13 and 14, the remote electricity safety management system (remote electricity safety diagnosis system) configured to include the digital distribution panel includes: a branch breaker 100 to which a detection module 200 detecting the voltage or current signal in the power supply line through a current transformer and a zero phase transformer mounted therein to output data converted into a digital form in the wireless communication is attached; a digital control module 300 receiving data output from the detection module of the branch breaker as a wireless signal to detect a state of voltage/current and an ON/OFF state of the main breaker and the branch breaker and output the detection data; a sensor module 600 detecting the surrounding environments of the digital distribution panel to output the sensing data through the wireless data; a gateway module 500 storing the detection data output from the digital control module and the sensing data output from the sensor module and transmitting the stored data to the upper server; and an SMPS 400 converting the AC current of the power supply line into the DC current and supplying the DC current to the gate digital control module and the gateway module.

In addition, the remote electricity safety management system is configured to further include an LCD module connected with the gateway module to directly confirm the detection data and the sensing data transmitted from the gateway module at the outside.

The branch breaker 100 is provided with a current transformer 120 (CT) for detecting overcurrent and a zero current transformer 140 (ZCT) for detecting leakage current and arc. In more detail, the branch breaker is provided with the current transformer 120 to penetrate through a power line of each phase R, S, T, and N and is provided with the zero current transformer 140 through which the power lines of all the phases penetrate. However, the configuration diagram schematically shows only any one power supply line rather than all the R, S, T, and N phases.

The detection module 200 included in the branch breaker 100 may be configured to include: a sensing resistor 210 converting an AC current signal sensed in the current transformer or the zero current transformer into an AC voltage signal; an amplifier 220 amplifying the AC voltage signal converted in the sensing resistor; a signal processing module resistor detecting a state of the AC voltage signal amplified through the amplifier; a root mean square value transformer 270 converting an AC voltage signal subjected to the signal processing through the signal processing module into a root mean square value of the DC; an AD converter 280 converting the DC converted in the root mean square value converter into a root mean square value resistance digital signal; a power supply side photocoupler 230 sensing a power supply state of a power supply side by receiving a signal output from a light-emitting diode connected with the power supply side terminal line of the branch breaker to receive power supply resistance of the power supply side and a terminal of a transistor conducted when the diode emits light; and a load side photocoupler 240 sensing a power supply state of a load side by receiving a signal from a light-emitting diode connected with the load side terminal line of the branch breaker to receive power supply resistance of the load side and a terminal of a transistor conducted when the diode emits light, thereby sensing the power supply state of the load side; power supply input and output terminals 260 receiving a signal output from a signal received on the phase of the power supply signal; a control unit sensing the power signal of the power supply side and the load side in the signal received from the power supply input and output terminals; a digital input and output device 290 amplifying the digital signal converted in the AD converter and the controller; and an RF communication unit transmitting a digital signal input to the digital input and output device in wireless communication.

The digital control module 300 is configured to include an RF communication unit 320 receiving a wireless digital signal transmitted from the detection module 200, the microprocessor 340 detecting the voltage/current state and the ON/OFF state of the main breaker and the branch breaker to generate the detection data and control the branch breaker while compensating and determining the digital signal received through the RF communication unit 320 in wireless communication, and an RS232 interface for transmitting the detection data to the gateway module 500.

Describing in more detail, the detection module 200 is provided with the sensing resistor 210 converting the AC current signal into the AC voltage signal for each detection sensor such as the current transformer 120 or the zero current transformer 140. In other words, the detection module 200 serves to convert the AC current of the current transformer 120 or the zero current transformer 140 into voltage through the sensing resistor 210.

The AC voltage signal converted in the sensing resistor 210 generally has a very small value of the sensing resistor 210 and thus, is the AC voltage signal having a very small value, which is in turn amplified through the amplifier 220. Preferably, there is a need to sufficiently amplify the AC voltage signal for performing RMS conversion. In this case, the signal is amplified by a differential amplifier having very large input impedance.

In addition, the detection module 200 is provided with the power supply side photocoupler 230 (PC1) and the load side photocoupler 240 (PC2) for sensing the power supply state at the power supply side terminal line and the load side terminal line of the branch breaker, respectively.

The power supply side photocoupler 230 is configured to include a diode 230a light emitted by being coupled with the power supply side terminal line of the branch breaker and a transistor 230b conducted by being supplied with base voltage when the diode 230a emits light.

The digital control module 300 receives the signal output from a connector terminal or an emitter terminal of the transistor 230b to sense the power supply state of the power supply side.

In addition, the load side photocoupler 240 includes a light-emitting diode 240a connected with the load side terminal line of the branch breaker to receive power and a transistor 240b conducted by receiving the base voltage when the diode 240a is light-emitted and the digital control module 300 receives the signal output from the connector terminal or the emitter terminal of the transistor 240b to sense the power supply state of the load side.

The power supply side photocoupler 230 includes the resistor 250 serving as the pull-up resistor between the power side terminal line supplied with power and the line between the diodes 230a in series to constantly maintain the input signal level.

In other words, the voltage applied to the diode 230a from the power supply side terminal line through the resistor 240 serving as the pull-up resistor is constantly maintained and thus, serves to constantly maintain the voltage applied from the power supply side, thereby preventing malfunction of the photocoupler, circuit breakdown, or the like, that may occur due to the application of the abnormal voltage.

Similarly, the load side photocoupler 240 includes the resistor 250 serving as the pull-up resistor between the load side terminal line supplied with power and the line between the diodes 240a in series to constantly maintain the input signal level and constantly maintain the voltage applied to the diode 240a from the load side terminal line through the resistor 260 serving as the pull-up resistor, thereby preventing malfunction of the photocoupler, circuit breakdown, or the like.

The signals are output through the emitter terminals or the collector terminals of the transistors 230b and 240b, respectively, of the power supply side and load side photocouplers 230 and 240 of the detection module 200 and are input through the power supply input and output terminals 310 formed with a plurality of pins and are then subjected to the digital signal processing by the control unit and are transmitted to the digital control module 300.

In the branch breaker supplied with power from the power supply side as shown in FIG. 15, the signals correspond to data regarding the case in which the output terminals of the transistors 230b and 240b that are each configured in the power supply side photocoupler 230 and the load side photocoupler 240 are set as the connector terminal.

In other words, the signals indicate the data detected through the microprocessor 340 of the digital control module 300 in the case in which the signals are output through the connector terminals of the transistors 230b and 240b, respectively, of the power supply side and load side photocouplers 230 and 240 as shown.

First, when the power is normally input to the branch breaker 100 of the distribution panel, that is, when both of the power supply state from the power supply side terminal and the load side terminal are in a high signal state, the low signal states are detected if the output signals are detected at the connector terminal of the transistors 230b and 240b, respectively, while both of the photocouplers 230 and 240 are operated.

For reference, if the output is detected at the connector terminal in consideration of the photocoupler, the low signal is output when the photocoupler is turned-on and the high signal is output when the photocoupler is turned-off.

Therefore, the digital control module 300 can recognize that power is normally supplied to either of the load side or the power supply side through the detection data.

Next, when the contacts of the branch breaker are opened by performing the trip operation of the branch breaker or when the wiring state of the load side is defective, the low signal is output from the power supply side photocoupler 230 and the high signal is output from the load side photocoupler 240.

Therefore, the digital control module 300 can recognize that the contacts are opened or the wiring defects of the load side are present while the branch breaker 100 is tripped through the detection data.

Next, similar to the case in which the main breaker (not shown) of the distribution panel is operated, when the supply of power to the branch breaker 100 stops or when the whole wiring supply line is defective, power is not supplied to either of the power side or the load side of the branch breaker 100.

In this case, the high signal is output from the power supply side photocoupler 230 and the high signal is also output from the load side photocoupler 240.

Therefore, the digital control module 300 can recognize that the contacts are opened or the whole wiring state of the distribution panel is defective through the detection signal while the main breaker is tripped.

However, the output terminals of the transistors 230b and 240b configured in the power supply side and load side photocouplers 230 and 240 are selected as the emitter terminal in consideration of the photocoupler to output the high signal when power is supplied to the power supply side and the load side and to output the low signal when power is not supplied thereto, such that the remote manager can visually confirm easily the state of the distribution panel, or the like.

The signal processing module processes signals of power factor (PF), harmonic distortion (THD), harmonic analysis, electric power, or the like, and the microprocessor 340 of the digital control module 300 determines that the electrical short occurs when the zero current is large and determines that the overload occurs when the magnitude in current exceeds the rated current.

In this case, the digital input and output device 290 is configured to output the digital force trip signal according to the current and voltage state determined through the microprocessor 340 and convert the force trip signal into an analog signal through the control unit and to be output through #5 of the power supply input and output terminals 260 to penetrate through the zero current transformer 140, thereby forcibly tripping the branch breaker 100.

As shown, the digital input and output device 290 is configured to penetrate the force trip signal through the zero current transformer 140 but may be configured to turn-on/off the branch breaker by transmitting and receiving the signals to and from the branch breaker and the contacts by including the magnetic circuit breaker (MCB) function in the branch breaker, in addition to the above scheme.

Figure 17:
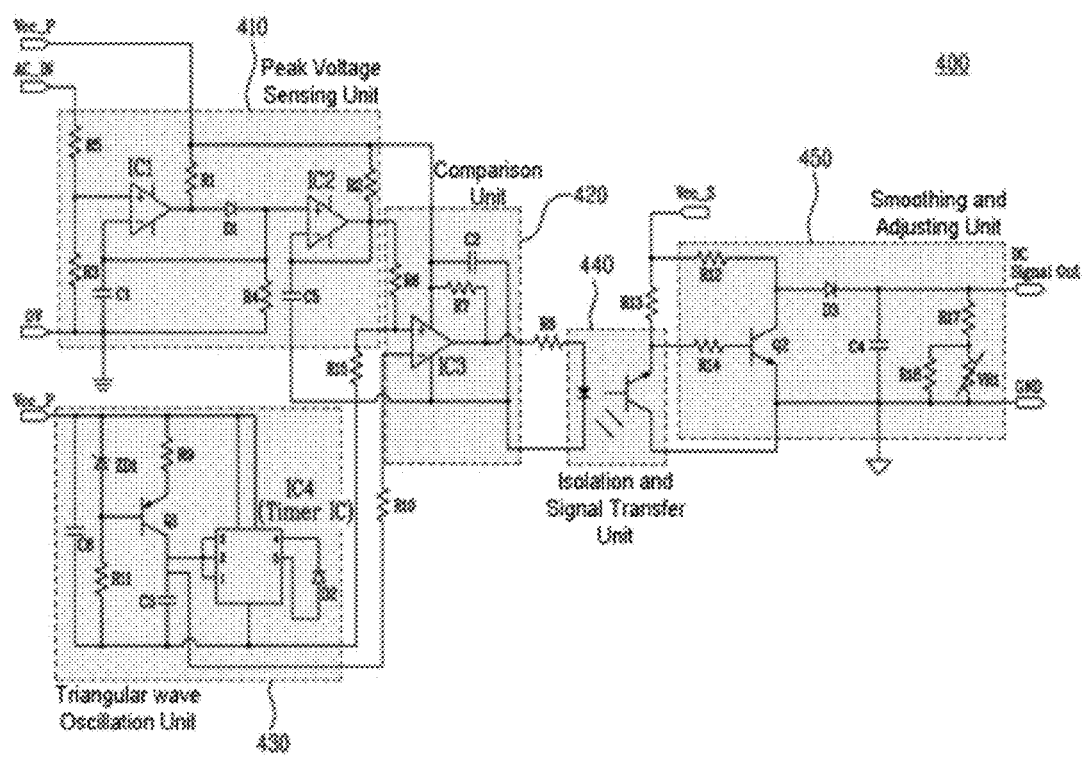
FIG. 17 is a circuit configuration diagram of the isolated SMPS using the photocoupler according to the present invention.
Figure 18:
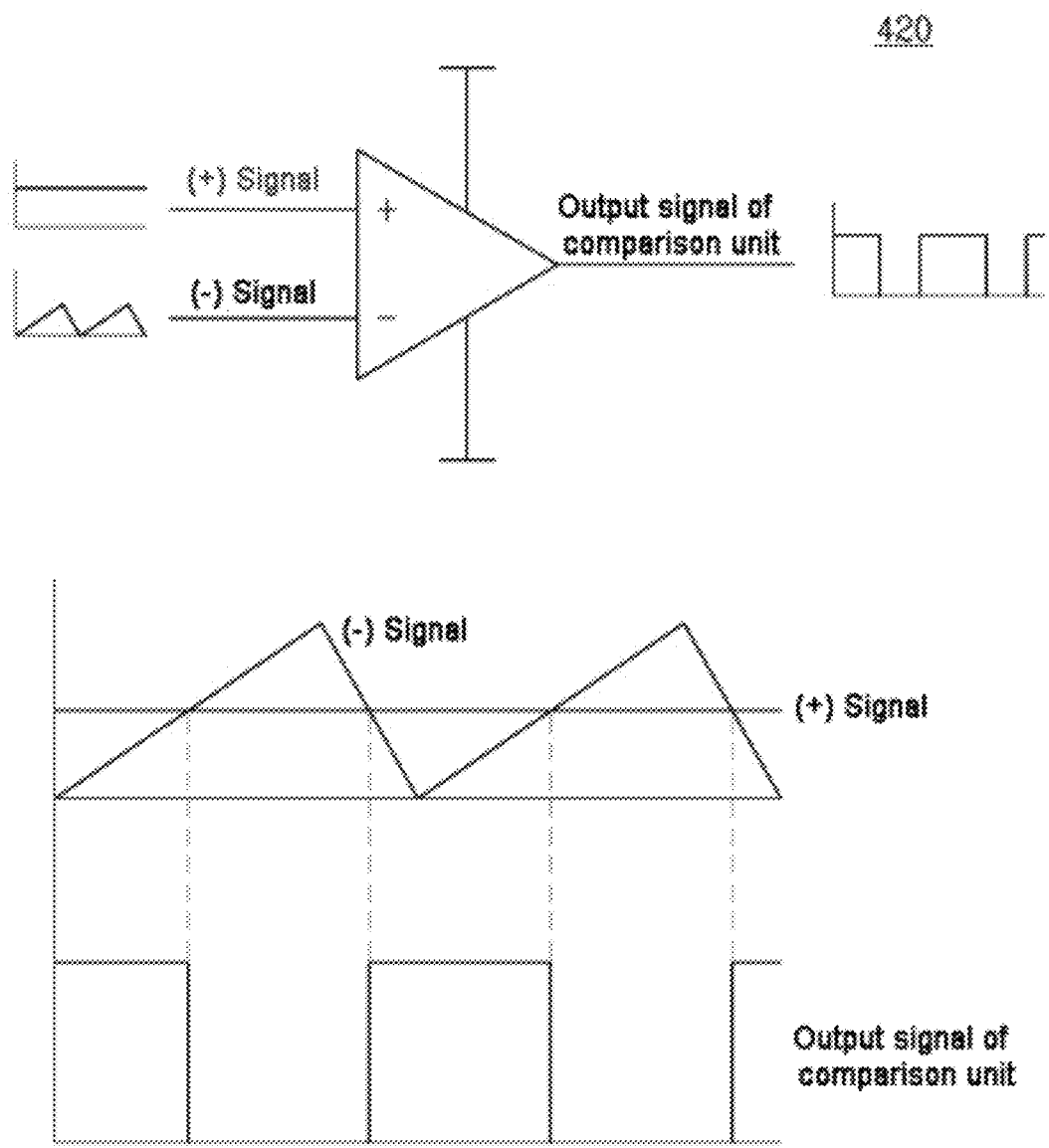
FIG. 18 is an operating state diagram of a comparator unit mounted in the SMPS according to the present invention.

FIG. 16 is a block diagram of an isolated SMPS using a photocoupler in the remote electricity safety diagnosis system according to the present invention, FIG. 17 is a circuit configuration diagram of the isolated SMPS using the photocoupler according to the present invention, and FIG. 18 is an operating state diagram of a comparator unit mounted in the SMPS according to the present invention.

Referring to FIG. 16, the SMPS 400 of the present invention is configured to include a peak voltage sensing unit 410, a comparator unit 420, a triangular oscillation unit 430, an isolation and signal transfer unit 440, a smoothing and adjusting unit 450.

The peak voltage sensing unit 410 reads the magnitude in AC voltage as the root mean square or reads the peak voltage value. When the peak voltage sensing unit 410 sets the peak voltage value to be $V_{pk}$ and sets the root mean square value to be $V_{rms}$, the following relation can be obtained. When the root mean square value is changed, the peak voltage value is changed in proportion thereto and the root mean square is detected when the peak voltage value is read.

$$V_{pk}\sqrt{2} \times V_{rms} \qquad \text{Equation 5}$$

Therefore, since the peak voltage is linearly changed according to the RMS value of the AC voltage, the oscillation unit generating an oscillation wave compared with the peak voltage should consider linearity.

When the peak voltage value acquired at the primary AC power supply side is a DC value, the high frequency transformer or the photo elements is used through the switching that is a general method for isolation. In order to transfer signals from the primary side to the isolated secondary side through the switching, the comparison signal in which the switching period may be constantly changed according to the magnitude in the DC value is required. For this reason, in the present invention, the triangular wave oscillator 430 is configured.

In other words, since the output waveform of the shaped triangular signal has a linear slope at the time of rising and falling, the width of the switching duration according to the change in the DC value acquired at the primary AC power supply side is constantly changed. Therefore, a timer IC having the oscillation circuit of excellent linearity may be preferably used.

The output of the triangular wave oscillation unit 430 is transferred to the comparator unit 420 that performs the switching operation by comparing it with the magnitude in the peak voltage at the peak voltage sensing unit 410.

The comparator unit 420 compares the magnitude of the peak voltage detected at the AC power supply that is the primary commercial power supply with that of the triangular wave generated at the triangular wave oscillation unit 430 to generate the square wave for operating the isolation and signal transfer unit 440.

The isolation and signal transfer unit 440 may be configured to include the photo element such as the photocoupler and transfers the primary side signal to the secondary side in the isolation state. In this case, as the magnitude in the commercial AC voltage is large, the width of the square wave is large, such that the secondary side size of the photocoupler is large.

The DC voltage is applied to the secondary system while the square wave signal transferred to the secondary side through the photocoupler that is the photo element is converted into the DC value via the internal rectifying circuit of the smoothing and adjusting unit 450.

Describing the operating principle of the present invention in more detail with reference to FIG. 17, the SMPS 400 that senses the magnitude in AC voltage of the primary side commercial power supply and outputs the sensed magnitude to the secondary side in the DC voltage form is provided with the peak voltage sensing unit 410. The peak voltage sensing unit 400 is configured to include two comparators IC1 and IC2, a resistor, and a switching diode D1. When the AC voltage AC_IN in which the primary side commercial power supply is subjected to full wave rectification, the divided voltage is input to +PIN of the IC1 by R3 and R5, which is input to +PIN of IC3 that is the comparator unit 430 via the IC2.

In this case, the signal generated by converting the highest value among the AC voltage input by performing the full wave rectification on the primary side commercial power into the DC value is input to +PIN of IC3 that is the comparator unit 430.

IC4 of the triangular wave oscillation unit 430 oscillates the triangular wave using the timer IC. In this case, the frequency of the oscillated triangular wave type is determined by R9 and C3. The generated triangular wave is input to −PIN of IC3 that is the comparator of the comparator unit 430 to compare with the magnitude of the output voltage input to +PIN.

As shown in FIG. 18, the comparator unit 420 generates the square wave by a pulse width modulation scheme so that the output is maintained at the TTL high when the DC value of the peak voltage sensing unit 410 is larger than the magnitude in the triangular wave of the triangular oscillation unit 430 and the output is maintained at the TTL low when the DC value of the peak voltage sensing unit 410 is smaller than the magnitude in the triangular wave of the triangular oscillation unit 430.

Therefore, the comparator unit 420 is configured to change the magnitude in the signal transferred to the secondary side according to the magnitude in the primary side AC voltage and also determines the magnitude in the waveform of the oscillation wave by including a zener diode ZD1 for adjusting the magnitude in the waveform of the triangular wave in the triangular oscillation unit 430.

The zener diode ZD1 is conducted when the voltage exceeding the reference voltage is applied at $V_{cc}\_P$ to apply the base voltage to the transistor Qi, such that power is input to IC4 while switching the transistor, thereby generating the oscillation wave at the IC4. When the DC value of the peak voltage sensing unit 100 is larger than the signal of the triangular wave of the triangular wave oscillation unit 130, the primary side diode of the photocoupler included in the isolation and signal transfer unit 140 is conducted while generating the square wave and thus, transfers the isolated signal to the secondary side of the photocoupler.

The voltage signal transferred to the secondary side is switched so as to conduct a transistor Q2 and the voltage applied to the smoothing and adjusting unit 450 by $V_{cc}\_S$ is smoothed using a smoothing circuit configured of a diode D3 and a capacitor C4 to obtain the DC voltage.

In this case, the desired voltage can also be adjusted by using the adjustment circuit configured of dividing resistors R17, R18, and VR1 in the smoothing and adjusting unit 450.

When voltage $V_{cc}$ of the secondary side is set to be $V_{cc}\_S$ and a duty ratio of the pulse width of the square wave is set to be D, the DC value through the smoothing and adjusting unit 450 is represented as follows.

Herein, if it is assumed that serial-parallel resistance values of resistors R17, R18, and VR1 are represented by RL, R12, and RH and a charging and discharging loss of C4 is "O" and the diode D3 is abnormal, the magnitude $V_{dc}$ in the DC voltage signal may be represented as follows.

$$V_{dc} = V_{cc\_S} \times \left(\frac{RH}{RF}\right) \times D \quad \text{Equation 6}$$

Further, if it is assumed that the forward voltage drop of the diode D3 is $V_f$, Equation 7 is modified as follows.

$$V_{dc} = (V_{cc\_S} - V_f) \times \left(\frac{RH}{RF}\right) \times D \quad \text{Equation 7}$$

In addition, the $V_{dc}$ value may be adjusted by adjusting the variable resistor VR1 to easily output the desired voltage value.

As a result, the magnitude in the AC voltage is detected by the peak voltage sensing unit 410 of the SMPS 400, the square wave is generated by comparing and modulating the detected magnitude with the triangular wave oscillated in the triangular wave oscillator 430, and the magnitude of the AC voltage can be detected by the magnitude in the DC voltage acquired by smoothing the square wave signal and converting the smoothed square wave signal into the DC voltage value.

In this case, the DC voltage is changed at the same ratio as the change in the DC voltage value and when using the commercial AC power supply, the change in the AC voltage value can be sensed as the electrically isolated signal, which can be appropriately used for various digital devices and control devices required to sense the commercial AC voltage.

The gateway module 500 is configured to include a black box 520 that stores the detection data output through the RS232 from the digital control module 300 and the sensing data output from the sensor module 600 and a processor 540 that controls the flow and the transmission to the remote server of the detection data output from the digital control module 300 and the sensing data output from the sensor module.

In other words, the gateway module 500 stores the signal regarding the detection data of the digital control module 300 and transmits the signal to the remote server and transmits the information from the sensor module 600 to the remote server to remotely monitor the harmful environment.

That is, the gateway module 500 may be transmit the state information of the current distribution panel to the remote server but records the past state information in the black box 520 for each time and each date and stores the information to be used as data for analyzing the accident factor. The black box 520 may be configured to include an SD RAM.

In addition, the gateway module 500 may be configured to flexibly cope with the mounting place and the environment by providing the method for connecting a network of RS485 and TCP/IP and to manage the sensing data of the sensor module 600 in wireless communication based on the Zigbee network protocol.

The sensor module 600 is configured to include any one of a thermal sensing sensor 610, a smoke sensor 620, a flooding sensor 630, and a vibration sensor 640 and outlet (socket) contact defect detection sensor 650 and to transmit the detected signals to the gateway module 500 in a Zigbee wireless communication scheme.

The thermal sensing sensor 610 senses temperature in the air to detect fire, the smoke sensor 620 detects smoke in the air to detect fire, and the flooding sensor 630 senses a flooding state of a place in which the distribution panel is mounted to prevent accidents due to electrical short.

Further, the vibration sensor 640 detects the vibrations due to the earthquake or the collapse of buildings to prevent electrical short accidents or fire.

Figure 19:
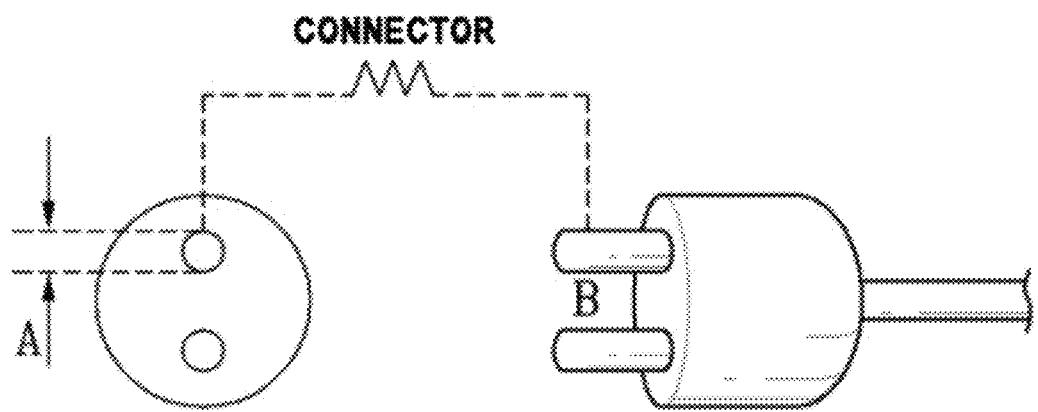
FIGS. 19 and 20 are state diagrams of an outlet connected with a plug.
Figure 20:
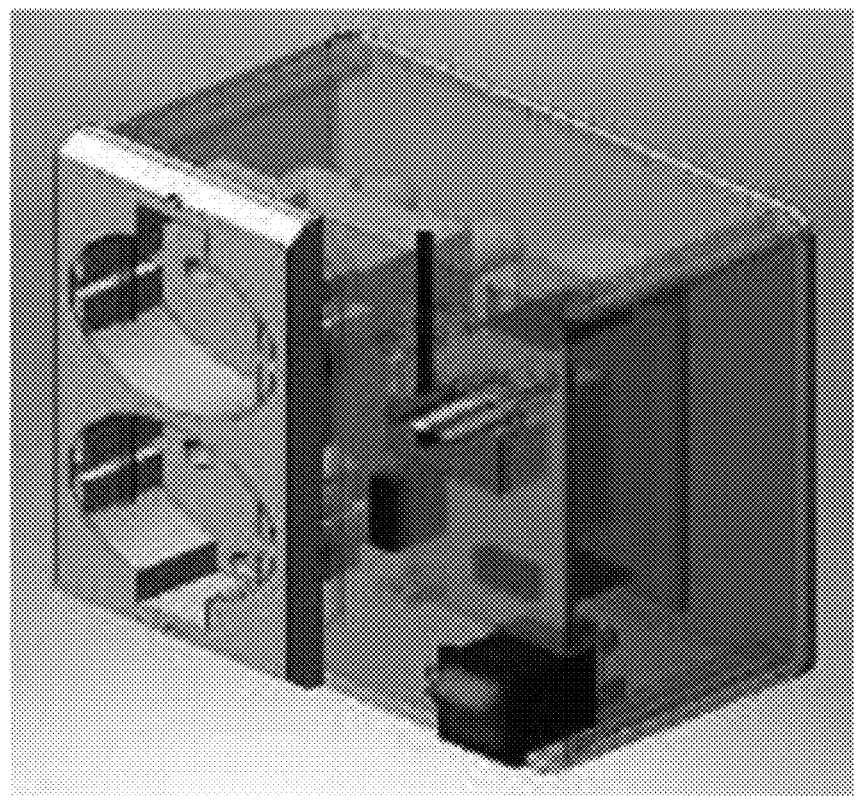
Figure 21:
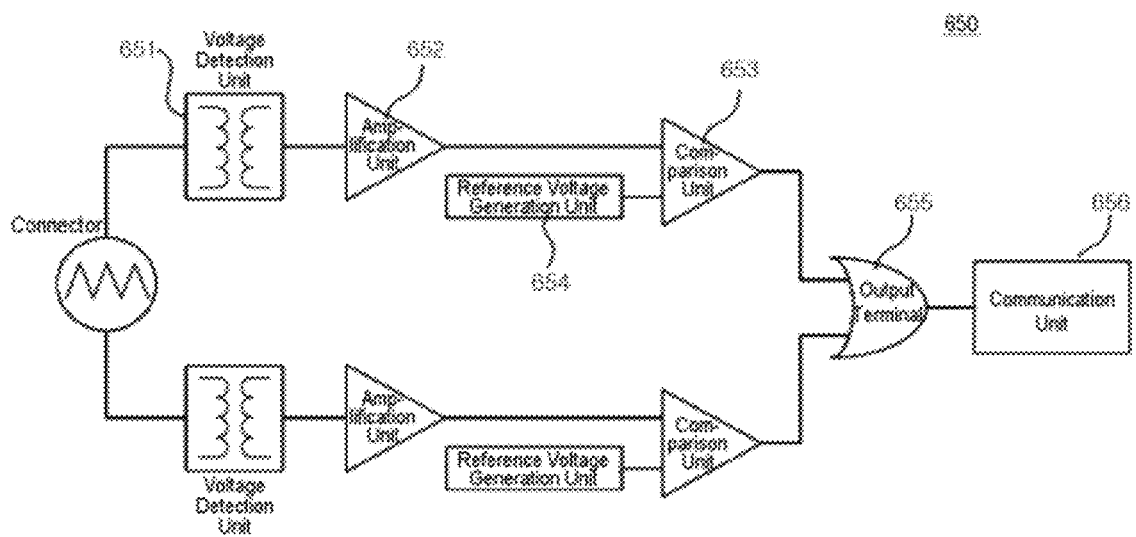
FIG. 21 is an operating configuration diagram showing a sensor for detecting outlet contact defects configured in a sensor module mounted in the distribution panel and a switch board according to the present invention.

FIGS. 19 and 20 are a state diagram of an outlet connected with a plug and FIG. 21 is an operating configuration diagram showing a sensor for detecting outlet contact defects configured in a sensor module mounted in the distribution panel and a switch board according to the present invention.

As shown in FIGS. 19 and 20, the outlet of the present invention includes a connector for supplying various kinds of power, wherein the connector is connected with a plug.

That is, the structure in which the power input to the outlet is output to the plug is provided. In the structure, the contact resistance occurs due to a loose connection between the connector A of the outlet and the connector B of the plug. Therefore, the contact defects occur while generating the difference in voltage.

The outlet contact defect detection sensor 650 senses the contact defects and increases the voltage of the outlet while increasing the contact resistance component by generating the contact defects. Therefore, when the degree of the increase in voltage exceeds the predetermined value, the outlet is melted due to heat generation and thus, the risk of fire is increased, such that the outlet contact defect detection sensor 650 continuously detects the difference in the input and output voltage of the outlet.

The outlet contact defect detection sensor is configured to include: a voltage detection unit 651 detecting the voltage of the outlet; an amplifier 652 amplifying a signal waveform output from the voltage detection unit; a reference voltage generation unit 654 generating reference voltage to the voltage state of the contact defects of the voltage detection unit; a comparator 653 determining voltage amount increased by comparing the output signal of the amplification unit with the output; and a communication unit 656 digitalizing the increased voltage amount determined in the comparator and transmitting the digitalized voltage amount to the gateway module 500.

Preferably, the outlet contact defect detection sensor may further include a temperature detection unit that senses the contact resistance due to the change in temperature by sensing the temperature of the connector of the outlet. The temperature detection unit includes a temperature sensor to generate a signal when detecting a temperature higher than a predetermined reference value, thereby preventing fire due to the contact resistance.

First, when the voltage detection unit 651 generates the fine voltage due to the contact defects or the oxidization of the outlet, it recognizes the fine signal waveform of the secondary side of the transformer using the transformer. The detected signal is amplified to a predetermined magnitude through the amplification 652 and is input to the comparator 653.

In this case, the comparator 653 receives the signal amplified in the amplification unit 652 and the reference signal generated from the reference voltage generation unit 654, thereby outputting the increased voltage change amount.

The output voltage is digitalized and then, is transmitted to the gateway module 500 through the output terminal 655 and the communication unit 656.

When each sensor of the sensor module 600 is not mounted separately and thus, is mounted at one place, they may be operated to have a single ID by being integrated and may be operated to have individual IDs when the position is selected individually, so as to facilitate the mounting or to be mounted at the optimal position for each sensor.

ZigBee means "wireless short range standard communication technology" having low power, low price, and ease of use and is a technology of standardizing an upper protocol and applications based on a PHY layer and an MAC layer of IEEE 802.15.4, which may be appropriately applied to the remote electricity safety diagnosis system mounted in the digital distribution panel according to the present invention that requires only a slow speed at a short range and hardly uses the network.

MODE FOR INVENTION

Hereinafter, a remote electricity safety diagnosis system according to another embodiment of the present invention will be described.

The gateway module 500 includes: a black box unit 520 storing the detection data input from the digital control module 300 and the sensing data input from the sensor module 600; the communication unit 560 communicating with the remote server; and the processor 540 controlling the communication unit 560 transmitting the black box ID indicating the mounting position of the black box unit 520 and the black box data including the detection/sensing data stored in the black box unit 520 for a predetermined time. In other words, the gateway module 500 stores the detection data of the digital control module 300 and transmits the stored detection data to the remote server and stores the information from the sensor module 600 and transmits the stored information to the remote server to remotely monitor the harmful environment. That is, the gateway module 500 may transmit the state information of the current distribution panel to the remote server but also records the past state information in the black box 520 for each time and each date and stores the information to be used as data for analyzing the accident factor.

The black box unit 520 serves as a kind of black box function in the distribution panel and may be configured to include the SD RAM. In addition, the black box unit 520 may be configured to flexibly cope with the mounting place and the environment by providing the method for connecting a network of RS485 and TCP/IP and to manage the sensing data of the sensor module 600 in wireless communication based on the Zigbee network protocol.

The following Table 1 shows the kind and range of data that are stored in the black box unit 520 and are transmitted to the remote server.

TABLE 1

| Division | | Symbol | Real Range | Byte | Value | Remarks |
|---|---|---|---|---|---|---|
| Power Supply | Main | CB | 0/1 | 1 Byte | 0: OFF, 1: ON | BREAKER STATE |
| | | Vrst | 0~999.9 | 2 Byte | ×10 | Voltage |
| | | Ir_T | 0~999.9 | 2 Byte | ×10 | Current |
| | | Is_T | 0~999.9 | 2 Byte | ×10 | |
| | | It_T | 0~999.9 | 2 Byte | ×10 | |
| | | IzT | 0~9.999 | 2 Byte | ×1000 | Leakage Current |
| | | cos (φ) | 0~99.9 | 2 Byte | ×10 | Power Factor |
| | | THD | 0~99.9 | 2 Byte | ×10 | HARMONIC SKEWNESS |
| | | KVA | 0~999.9 | 2 Byte | ×10 | Load |
| | Power | CB[1 ... 16] | 0/1 | 1 Byte | 0: OFF, 1: ON | BREAKER STATE |
| | | Vrst_M | 0~999.9 | 2 Byte | ×10 | |
| | | Ir_M[1 ... 16] | 0~999.9 | 2 Byte | ×10 | |
| | | Is_M[1 ... 16] | 0~999.9 | 2 Byte | ×10 | |
| | | It_M[1 ... 16] | 0~999.9 | 2 Byte | ×10 | |
| | | Iz_M[1 ... 16] | 0~999.9 | 2 Byte | ×1000 | |
| | | cos (φ) | 0~9.9 | 2 Byte | ×10 | Reserved |

TABLE 1-continued

| Division | | Symbol | Real Range | Byte | Value | Remarks |
|---|---|---|---|---|---|---|
| | | THD | 0~99.9 | 2 Byte | ×10 | Reserved |
| | | KVA | 0~999.9 | 2 Byte | ×10 | Reserved |
| | Lamp | CB[1 ... 16] | 0/1 | 1 Byte | 0: OFF, 1: ON | Breaker State |
| | | Vrst_M | 0~999.9 | 2 Byte | ×10 | |
| | | Ir_M[1 ... 16] | 0~999.9 | 2 Byte | ×10 | |
| | | Is_M[1 ... 16] | 0~999.9 | 2 Byte | ×10 | |
| | | It_M[1 ... 16] | 0~999.9 | 2 Byte | ×10 | |
| | | Iz_M[1 ... 16] | 0~999.9 | 2 Byte | ×1000 | |
| | | cos (φ) | 0~9.9 | 2 Byte | ×10 | Reserved |
| | | THD | 0~99.9 | 2 Byte | ×10 | Reserved |
| | | KVA | 0~999.9 | 2 Byte | ×10 | Reserved |
| MPNP Sensor | Safety Factor | SF (Safety Factor) | 0~100 | 1 Byte | 0~100 | |
| | Temperature | Temperature | −99.9~99.9 | 2 Byte | ×10 | |
| | Humidity | Humidity | 0~99.9 | 2 Byte | ×10 | |
| | Vibration | Vibration | 0~10 | 1 Byte | 0: NO, 1: Very Weak DETECTION 2: WEAK DETECTION, 4: STRONG DETECTION | |
| | Flooding | Water | 0/1 | 1 Byte | 0: NO 1: DETECTION | |
| | Smoke | Smoke | 0/1 | 1 Byte | 0: NO 1: DETECTION | |

Describing Table 1, there is a term the 'safety factor (SF)', which digitalizes the surrounding state of the distribution panel and is calculated by the processor 540. The safety index calculation Equation depends on the following Equation.

$$\{(Temperature-65)>0?1:0\}*25+Vibration/4*25+Water*25+Smoke*25 \qquad \text{Equation 8}$$

Further, the processor 540 stores the calculated safety factor in the black box unit 520 and includes it in the black box data.

In addition, the processor 540 generates the black box data table as shown in the following Table 2.

TABLE 2

| Division | | Data | | | | |
|---|---|---|---|---|---|---|
| | | Division 1 | Division 2 | Division 3 | Division 4 | Division 5 |
| B/B ID | Term | Province | City | District/Dong | Building/Lot number | Small Division |
| | Byte | 1 | 1 | 1 | 2 | 2 |
| Power Supply Data | Term | Main | Power | Lamp | | |
| | Byte | 17 | 169 | 169 | | |
| Sensor Data | Term | Temperature | Humidity | Vibration | Flooding | Smoke |
| | Byte | 2 | 2 | 1 | 1 | 1 |

The Table 3 is a format of the black box data transmitted to the remote server by the gateway module 500.

TABLE 3

| Term | Header | | | | Length 1 | | | Length 0 | | | Frame | | | Footer |
|---|---|---|---|---|---|---|---|---|---|---|---|---|---|---|
| Byte (353) | 1 | | | | 1 | | | 1 | | | 349 | | | 1 |
| Frame | B/B ID | | | | Power Supply Data | | | Sensor Data | | | | | | CHECKSUM |
| | Province | City | District | Building | Small Division | Main | Power | Lamp | Temperature | Humidty | Vibration | Flooding | Smoke | |
| Byte (349) | 1 | 1 | 1 | 2 | 2 | 17 | 169 | 169 | 2 | 2 | 1 | 1 | 1 | 1 |

Meanwhile, the processor 540 receives the response data from the remote server receiving the black box data and as a result of confirmation of the received response data, controls the communication unit 560 to retransmit the black box data to the remote server when the retransmission request message is included in the response message. The following Table 4 shows the format of the response message.

TABLE 4

| Term | Header | | | | | LENGTN 1 | LENGTN 0 | FRAME | FOOTER |
|---|---|---|---|---|---|---|---|---|---|
| | 1 B/B ID | | | | | 1 | 1 | 349 | 1 |
| | Province | City | District | Building | Small Division | | RESPONSE OK/NG | Rej (Retransmission Request) | CHECKSUM |

That is, when the remote server does not receive packets or has errors, the remote server sets terms OK/NG and Rej to 'I' and transmits the response message to the gateway module 500 to request the data retransmission. If the Rej is reset to "O", the gateway module 500 completes the data transmission.

Hereinafter, a configuration of detecting contact defects within the electric connector according to the embodiment of the present invention will be described in detail.

Figure 22:
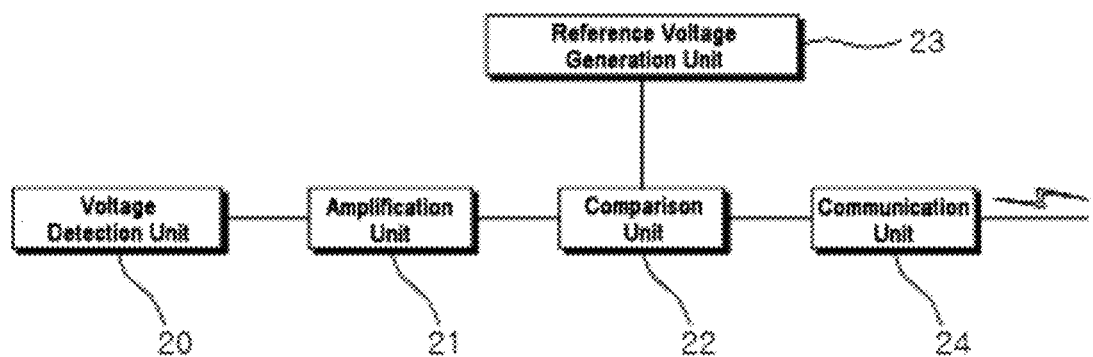
FIG. 22 is a diagram showing a configuration of an apparatus for detecting contact defects within an electric connector according to an embodiment of the present invention.

FIG. 22 is a diagram showing a configuration of an apparatus for detecting contact defects within an electric connector according to an embodiment of the present invention. Hereinafter, an apparatus for detecting contact defects within the electric connector will be described below with reference to FIG. 22.

Referring to FIG. 22, the detection apparatus includes a voltage detection unit 20, an amplification unit 21, a comparison unit 22, a reference voltage generation unit 23, and a communication unit 24. Further, the detection apparatus may include other components other than the above-mentioned components.

The voltage detection unit 20 is connected with the electric connector (including socket and outlet) including the transformer, or the like, or the power supply plug. When the resistance component is increased due to the contact defects of the electric connector and the power plug, the voltage is also increased. The voltage detection unit detects the generated fine voltage and outputs the detected fine voltage to the amplifier 21.

According to the embodiment of the present invention, when the contact resistance is increased due to the contact defects or the oxidation within the electric connector, the voltage is finely increased accordingly. The finely increased voltage may use the transformer of the voltage detection unit to detect the fine signal waveform. The fine signal waveform detected using the transformer is output to the amplification unit 21.

In addition, the voltage detection unit 20 may further include the temperature detection unit (not shown) including the temperature sensor. The temperature detection unit detects the temperature of the electric connector or the power supply plug and compares the detected temperature with a predetermined reference temperature. The temperature detection unit may generate an alarm signal when the detected temperature is higher than the predetermined reference temperature and transmit the generated alarm signal to an information collection server. The information collection server may include a wall-pad mounted in a house or equipment communicating with the information collection server.

The amplification unit 21 amplifies the fine voltage input from the voltage detection unit 20 and outputs the amplified fine voltage to the comparator 22. The reference voltage generation unit 23 generates the voltage having a predetermined magnitude set by the user and outputs the generated voltage to the comparison unit 22.

The comparator 22 compares the voltage received from the amplification unit 21 with the voltage received from the reference voltage generation unit 23. The comparison unit 22 generates the voltage change amount received from the amplification unit 21 based on the voltage received from the reference voltage generation unit 23 and outputs the generated voltage change amount to the communication unit 24. The comparator 22 cannot output the comparison results to the communication unit 24 when the voltage received from the amplifier 21 is smaller than the voltage received from the reference voltage generation unit 23 according to the setting.

In this case, the voltage input and amplified as AC voltage from the amplification unit 21 may be preferably converted into the DC voltage for comparing with the reference voltage.

The communication unit 24 uses the wireless communication network including a wired communication network using power line communication or a wireless communication network including any one of Bluetooth, Zigbee, Z-WAVE, RF, USB communication, and infrared communication to provide a communication interface with the information collection server disposed at a remote site. The communication unit 24 converts the input voltage change amount into a digital signal and transmits the converted digital signal to the information collection server and may generate the alarm sound while transmitting the voltage change amount converted into the digital signal.

In addition, the communication unit 24 may further include an alarm unit (not shown) that receives the voltage change amount from the comparator 22 to generate the alarm sound or a display unit and inform of it to the outside.

Figure 23:
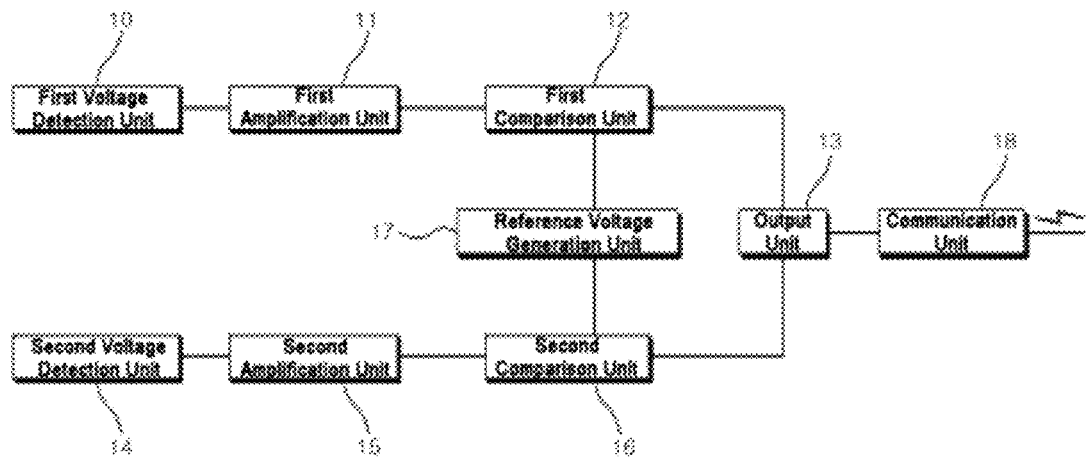
FIG. 23 is a diagram showing an apparatus for detecting contact defects within the electric connector according to the embodiment of the present invention.

FIG. 23 is a diagram showing an apparatus for detecting contact defects within the electric connector according to the embodiment of the present invention. According to the FIG. 23, the detection device includes a first voltage detection unit 10, a first amplification unit 11, a first comparison unit 12, a first output unit 13, a second voltage detection unit 14, a second amplification unit 15, a second comparison unit 16, a reference voltage generation unit 17, and a communication unit 18. FIG. 23 shows a single reference voltage generation unit but may include two reference voltage generation units according to the setting of the user.

That is, the second comparison unit 12 measures the first voltage change amount by detecting the fine voltage using the first voltage detection unit 10 connected with the electric connector and then, outputs the measured first voltage change amount to the output unit 13.

The second comparison unit 12 measures the second voltage change amount by detecting the fine voltage using the second voltage detection unit 14 connected with the power supply plug and then, outputs the measured second voltage change amount to the output unit 13. The output unit 13 may transmit the voltage change amount to the information collection server of the remote site through the communication unit 18. Further, the output unit 13 may generate the alarm signal when the voltage change amount exceeds the set voltage change amount.

Figure 24:
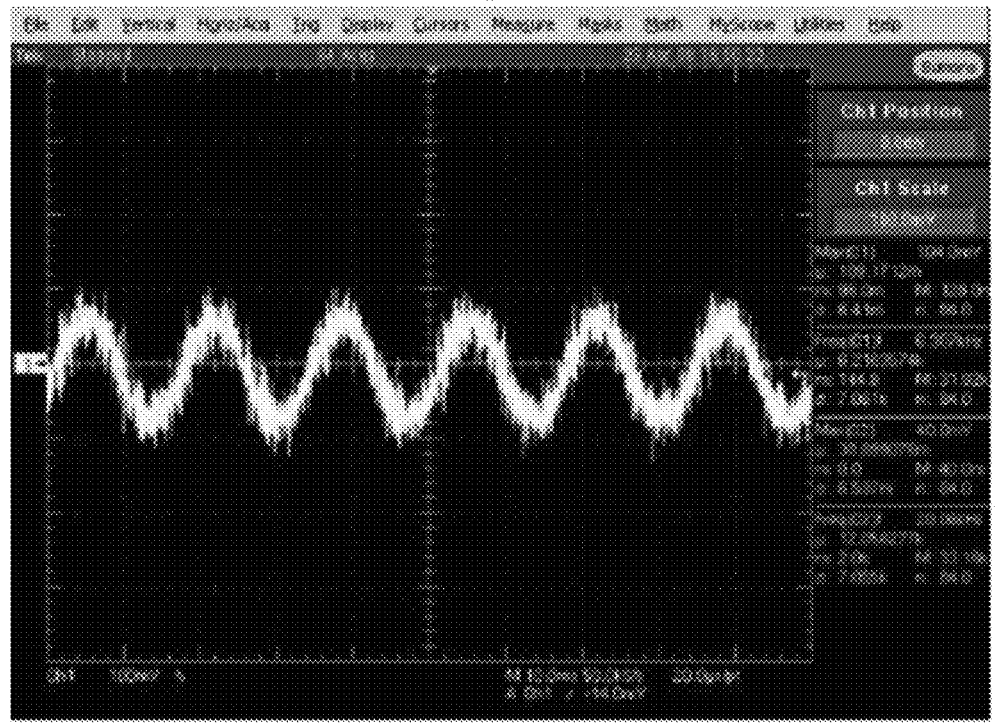
FIG. 24 is a reference diagram showing a change in voltage due to the contact defects within the electric connector according to the embodiment of the present invention.
Figure 25:
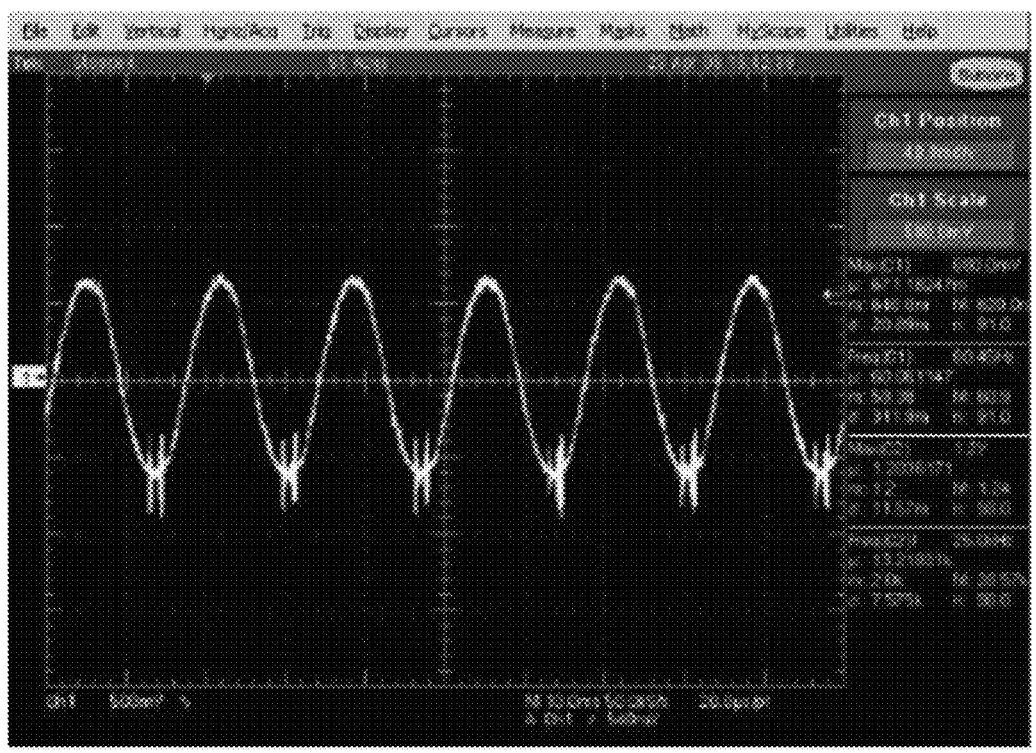
FIG. 25 is a diagram showing a sine wave normally output in a state in which a power plug within the electric connector according to the embodiment of the present invention is normally connected.

FIG. 24 is a reference diagram showing a change in voltage due to the contact defects within the electric connector according to the embodiment of the present invention and FIG. 25 is a diagram showing a sine wave normally output in a state in which a power plug within the electric connector according to the embodiment of the present invention is normally connected.

Figure 26:
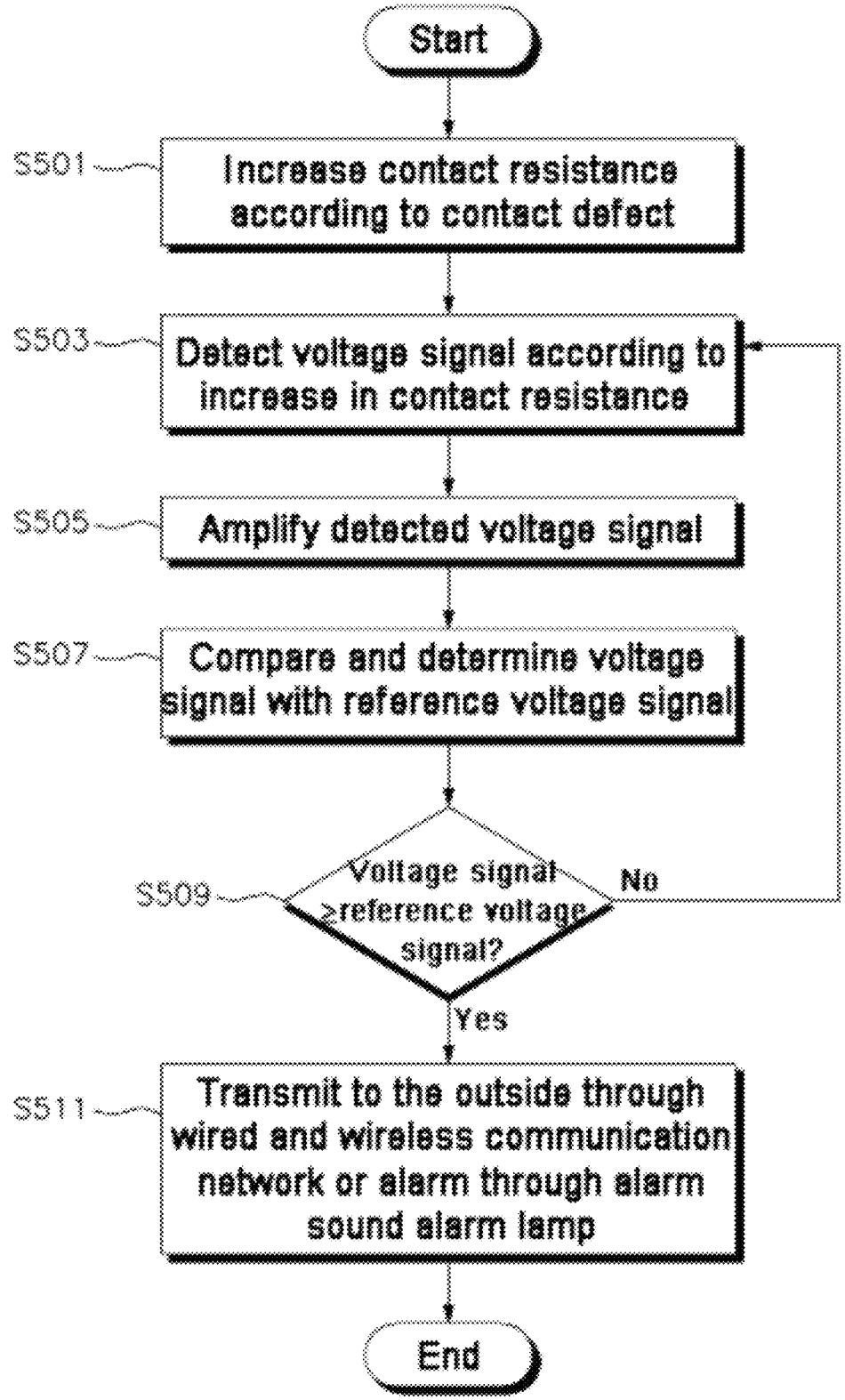
FIG. 26 is a flow chart showing a method for detecting contact defects within the electric connector according to the embodiment of the present invention.

FIG. 26 is a flow chart showing a method for detecting contact defects within the electric connector according to the embodiment of the present invention.

First, as shown in FIG. 25, even though the voltage indicating the normal sine wave is detected in the state in which the power supply plug is normally connected with the electric connector, the contact resistance is increased when the power supply plug is not normally connected with the electric connector, that is, when the contact defects occur, such that the change in voltage occurs as shown in FIG. 24 (S501).

In this case, the voltage detection unit 20 detects the fine voltage according to the increase in contact resistance and outputs the detected fine voltage to the amplification unit 21 (S503).

The amplification unit 21 amplifies the fine voltage and outputs the amplified fine voltage to the comparison unit 22 (S505). The comparison unit 22 compares the reference voltage input so as to differentiate the voltage change amount (or voltage difference) from the reference voltage generation unit 23 with the voltage input from the amplification unit 21 to compare the voltage change amount (or voltage difference) (S507).

When the detected voltage is higher than the reference voltage, that is, when the increase in voltage (voltage change amount or voltage difference) is extreme, the fire may occur due to the melting within the electric connector (or socket, outlet, or the like) due to the heat generation and then, the comparator 22 transmits the voltage change amount to the communication unit 24, the communication unit 24 converts the input voltage change amount into the digital type and generates the alarm signal and then, transmits the digital information to the information collection server, or the like, at the remote site through the wired and wireless communication network (S511).

When the alarm unit (not shown) is further included in the contact defect detection apparatus (not shown), the mutually compared voltage change amount is output to the alarm lamp, the alarm sound, or the display unit and may be displayed to enable a manager to directly confirm the issue on the spot.

Figure 27:
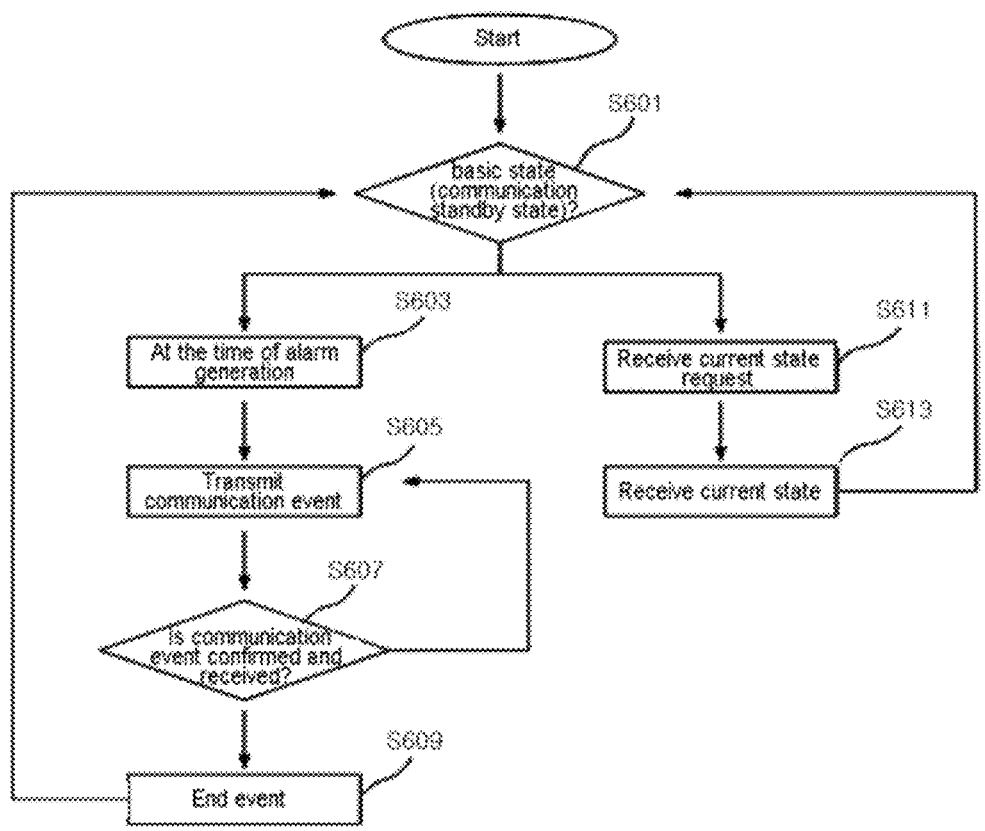
FIG. 27 is a flow chart showing a process of transmitting information collected in the apparatus for detecting contact defects of the electric connector according to the embodiment of the present invention.

FIG. 27 is a flow chart showing a process of transmitting information collected in the apparatus for detecting contact defects of the electric connector according to the embodiment of the present invention. Hereinafter, a process of transmitting information collected in the detection apparatus will be described with reference to FIG. 27.

The contact defect detection apparatus maintains the communication standby state that is the basic state (S601). The contact defect detection apparatus determines whether the alarm is generated or whether the current state request is received through the communication unit 24. The contact defect detection apparatus moves to step S605 when the event transmission is required and moves to step S611 when the current state request is received.

The contact defect detection apparatus determines that the event transmission is required, when the predetermined voltage change amount exceeds the predetermined voltage change amount or when the temperature sensed by the temperature sensor exceeds the predetermined temperature.

The contact defect detection apparatus transmits data including the generated event to the information collection server (S605) and receives data informing that the communication event is received from the information collection server (S609). When the data informing that the communication event is received from the information collection server is not received, the contact defect detection apparatus moves to step S605 to retransmit the data including the generated event.

When the contact defect detection apparatus receives the data informing that the communication event is received from the information collection server, the event ends (S609).

When the contact defect detection apparatus receives the current state request from the information collection server (S611), the data including the collected current state is transmitted to the information collection server (S613).

FIG. 27 shows that the contact defect detection apparatus transmits the current state when the current state request is received from the information collection server but is not limited thereto. That is, the contact defect detection apparatus may collect the current state at the predetermined duration and may transmit the collected current state to the information collection server.

The following Table 5 shows a protocol structure of data requesting the transmission of the current state by the contact defect detection apparatus in the information collection server.

TABLE 5

| Slave Address | Function | Start Address | No. of Points | Error Check |
| --- | --- | --- | --- | --- |
| 1 Byte | 1 Byte | 2 Byte | 2 Byte | 2 Byte |

Referring to Table 5, the protocol of the data includes a slave address, a function, a start address, a number of points, and an error check. The slave address represents the identifier of the contact defect detection apparatus requesting the current state transmission and a function represents which information the protocol transmits or which transmission and reception of information the protocol requests. According to the present invention, the function includes the request of the current state of the contact defect detection apparatus. A start address represents an address in which the requested current state is described.

The number of points means the amount of information requested from the contact defect detection apparatus by the information collection server. According to the present invention, the number of points requests only whether the abnormality occurs and thus, the number of points is set to be 1. The error check checks errors occurring during the transmission of data.

The following Table 6 shows a protocol structure of data transmitting a current state from the apparatus for detecting contact defects to the information collecting server.

TABLE 6

| Slave Address | Function | Byte Count | Data | Error Check |
| --- | --- | --- | --- | --- |
| 1 Byte | 1 Byte | 1 Byte | 2 Byte | 2 Byte |

Referring to Table 6, the protocol of the data transmitting the current state from the apparatus for detecting contact defects to the information collecting server includes a slave address, a function, a byte count, data, and an error check. The byte count means the total number of transmitted data, and the data includes whether the electrical connecting unit is normal or has an error. That is, the apparatus for detecting contact defects informs whether a contact defect of the electrical connecting unit is generated using the data.

The following Table 7 shows a protocol structure of data transmitting a generated event to the information collecting server in the case in which an event is generated in the apparatus for detecting contact defects.

TABLE 7

| Slave Address | Function | Start Address | No. of Points |
|---|---|---|---|
| 1 Byte | 1 Byte | 2 Byte | 2 Byte |
| Byte Count | Data | | Error Check |
| 1 Byte | 2 Byte | | 2 Byte |

Referring to Table 7, the protocol of the data includes a slave address, a function, a start address, a number of points, a byte count, data, and an error check. As described above, the data includes whether the electrical connecting unit is normal or has an error. As an example, when the electrical connecting unit is normal, the data may be indicated as "00 00", and when a contact defect occurs, the data may be indicated as "00 11".

The following Table 8 shows a protocol structure of response data transmitted from the information collecting server informed of event generation by the apparatus for detecting contact defects to the apparatus for detecting contact defects.

TABLE 8

| Slave Address | Function | Start Address | No. of Points | Error Check |
|---|---|---|---|---|
| 1 Byte | 1 Byte | 2 Byte | 2 Byte | 2 Byte |

Referring to Table 8, the protocol of the data includes a slave address, a function, a start address, a number of points, and an error check.

Figure 28:
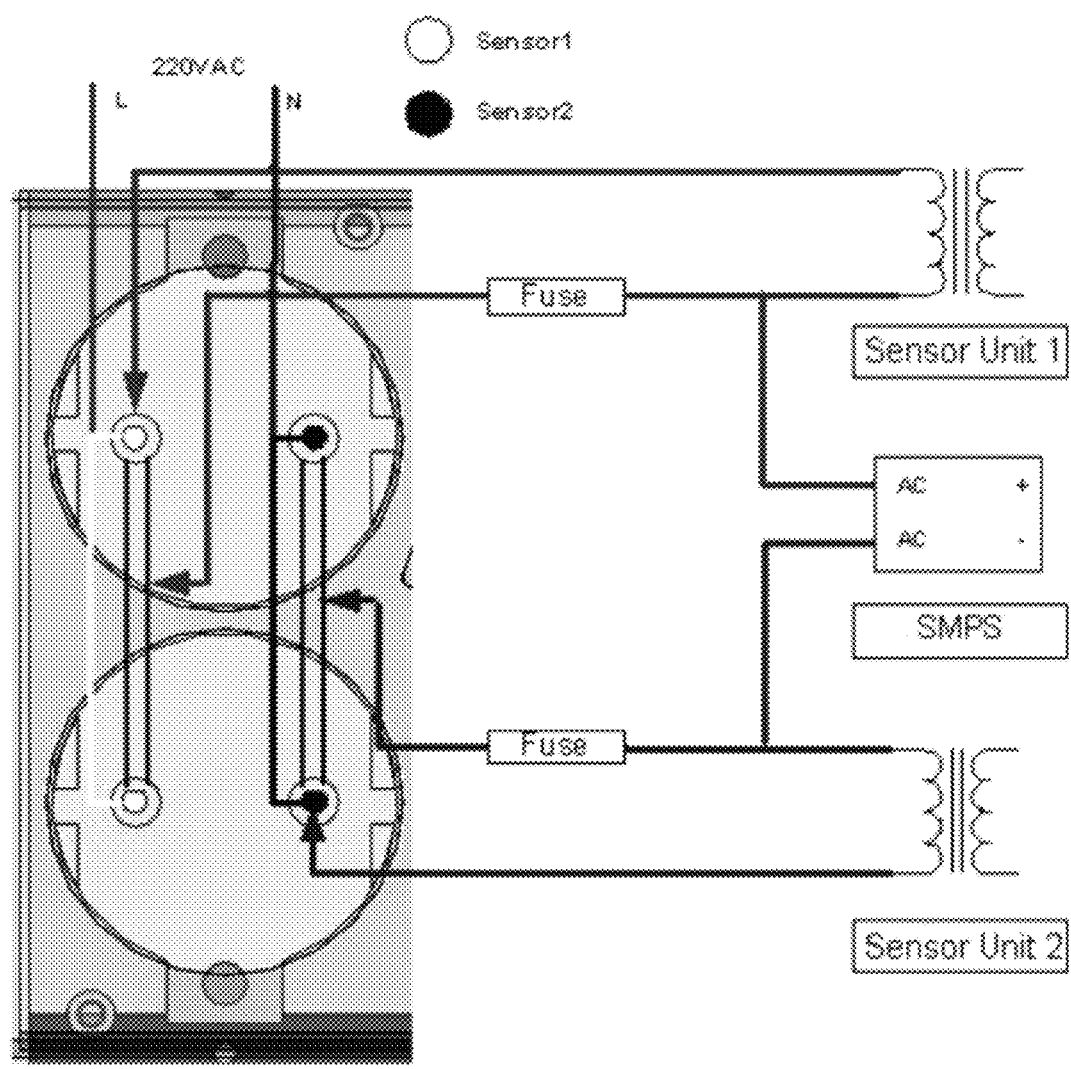
FIG. 28 is a diagram showing an example of supplying power to the apparatus for detecting contact defects according to the embodiment of the present invention.

FIG. 28 is a diagram showing an example of supplying power to the apparatus for detecting contact defects according to the embodiment of the present invention. Referring to FIG. 21, the apparatus for detecting contact defects detects contact defects in each of the sensors of an L phase and an N phase and supplies power to the SMPS using the lines coming from the sensors of each of the two phases. The SMPS converts the supplied power into DC 5V to use DC 5V as power of the apparatus for detecting contact defects. Although the apparatus for detecting contact defects may include a separately added power supply unit, it may be supplied with the power from an AC 220V terminal as shown in FIG. 21 in consideration of a volume, or the like, of the apparatus for detecting contact defects.

Figure 29:
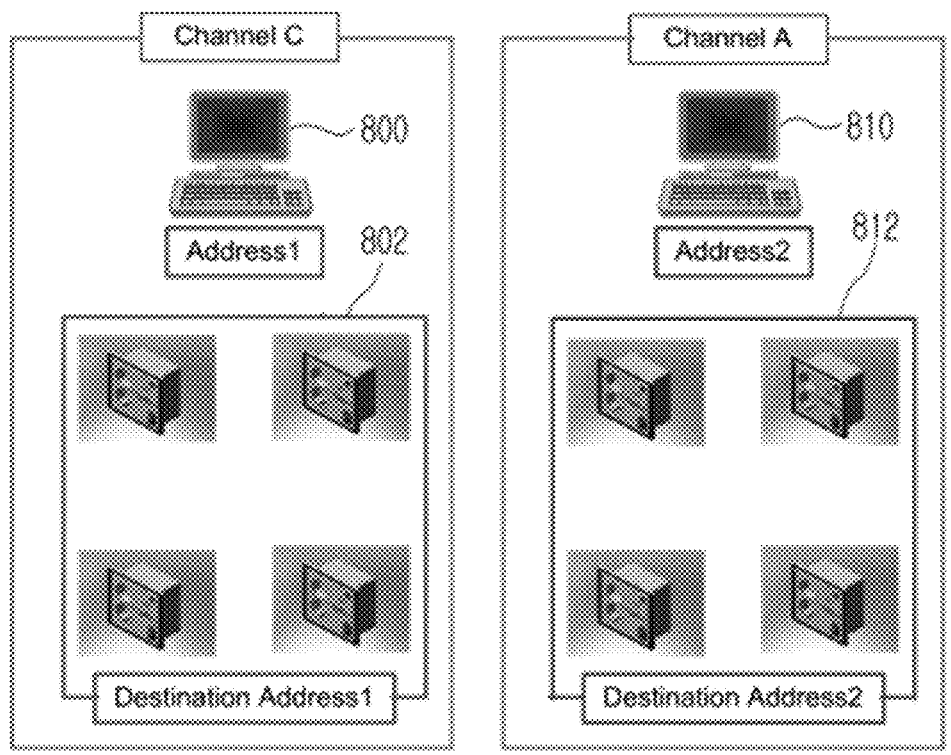
FIG. 29 is a diagram showing an example of dividing the apparatus for detecting contact defects according to the embodiment of the present invention into at least two groups and performing communication with an information collecting server.

FIG. 29 is a diagram showing an example of dividing the apparatus for detecting contact defects according to the embodiment of the present invention into at least two groups and performing communication with an information collecting server.

FIG. 29 shows an information collecting server 1 800, an information collecting server 2 810, a contact defect detecting apparatus group A 802 and a contact defect detecting apparatus group B 812. The information collecting server 1 800 performs communication with the apparatuses for detecting contact defects included in the contact defect detecting apparatus group A 802, and the information collecting server 2 810 performs the communication with the apparatuses for detecting contact defects included in the contact defect detecting apparatus group B 812. That is, the apparatuses for detecting contact defects included in the contact defect detecting apparatus group A 802 transmit the collected information to the information collecting server 1 800, and the apparatuses for detecting contact defects included in the contact defect detecting apparatus group B 812 transmit the collected information to the information collecting server 2 810.

Referring to FIG. 29, the apparatus for detecting contact defects in the contact defect detecting apparatus group A 802 performs communication with the information collecting server 1 800 using the address 1 of the channel C, and the apparatus for detecting contact defects in the contact defect detecting apparatus group B 812 performs communication with the information collecting server 2 810 using the address 2 of the channel A. As described above, the adjacent information collecting servers perform the communication using different channels or addresses, thereby making it possible to prevent collision between the transmitted data. Although FIG. 29 shows that both the channels and the addresses perform the communication in different schemes, the communication may also be performed using different addresses.

The contact defect detecting apparatus may perform communication with the information collecting server through the adjacent contact defect detecting apparatus in the case in which it may not perform direct communication with the information collecting server. Therefore, the contact defect detecting apparatus disposed at a communication blank zone may perform the communication with the information collecting server.

While the present invention has been described in connection with the exemplary embodiments thereof, it is obvious to those skilled in the art that various modifications and variations can be made without departing from the scope of the present invention.

The invention claimed is:

1. A remote electricity safety diagnosis system, comprising:
a digital switch gear detecting AC voltage or current of a power supply line with a sensor, and diagnosing an arc or a partial discharge in a detected waveform and storing the arc or the partial discharge as a diagnosis data and transmitting the diagnosis data to an upper server, so as to diagnose safety of electric facilities; and
a digital distribution panel including a main breaker and a branch breaker and detecting AC voltage or current input through the power supply line and storing the AC voltage or current as a detection data, and sensing and breaking the arc in the detection data, and transmitting the detection data to the upper server through wired and wireless communication,
wherein the digital distribution panel includes:
a distribution panel controller detecting the current and voltage of the power supply line and an on/off state of a breaker and controlling the breaker; a sensor module configured to include at least one sensor mounted around the distribution panel;
a black box unit storing the detection data input from the distribution panel controller and the sensing data input from the sensor module; and
a communication unit transmitting a message to the remote server using a data stored in the black box unit and receiving a response message; and a gateway module including a processor controlling the communication unit.

2. The remote electricity safety diagnosis system as claimed in claim 1, wherein the digital switch gear include:
 a data accumulation unit accumulating and storing arc data detected at a predetermined time in the sensor; an alarm comparison unit setting an alarm level of the arc or partial discharge through a comparator and generating an alarm at the time of exceeding the alarm level; and
 a trend analysis unit detecting and analyzing a generation frequency of the arc or partial discharge in the arc data accumulated by the data accumulation unit, and generating and storing a current trend or a short-term prediction trend data.

3. The remote electricity safety diagnosis system as claimed in claim 1, wherein the digital distribution panel includes:
 a branch breaker having a detection module which detects the voltage or current signal in the power supply line through a current transformer or a zero-phase-sequence current-transformer and converts the voltage or current signal into a digital data and output the digital data in the wireless communication;
 a digital control module receiving the digital data, detecting a state of voltage/current and an ON/OFF state of the main breaker and an ON/OFF state of the branch breaker and outputting the detection data and;
 a sensor module detecting the surrounding environments of the digital distribution panel and outputting the sensing data through the wireless data;
 a gateway module storing the detection data from the digital control module and the sensing data from the sensor module and transmitting the detection data and the sensing data to the upper server;
 an LCD module connected with the gateway module to directly confirm the detection data and the sensing data transmitted from the gateway module at the outside; and
 an SMPS converting the AC current of the power supply line into the DC current and supplying the DC current to the gate digital control module and the gateway module.

4. The remote electricity safety diagnosis system as claimed in claim 3, wherein the detection module of the branch breaker includes:
 a sensing resistor converting an AC current signal sensed in the current transformer or the zero current transformer into an AC voltage signal;
 an amplifier amplifying the AC voltage signal converted in the sensing resistor;
 a signal processing module detecting a state of the AC voltage signal amplified through the amplifier;
 a root mean square value transformer converting the AC voltage signal from the signal processing module into a root mean square value of the DC voltage through the signal processing module;
 an AD converter converting the root mean square value of the DC voltage into a root-mean-digital-signal;
 a power supply side photocoupler sensing a power supply state of a power supply side by receiving a signal output from a light-emitting diode connected with the power supply side terminal line of the branch breaker to receive power supply resistance of the power supply side and a terminal of a transistor conducted when the diode emits light; and
 a load side photocoupler sensing a power supply state of a load side by receiving a signal from a light-emitting diode connected with the load side terminal line of the branch breaker to receive power supply resistance of the load side and a terminal of a transistor conducted when the diode emits light;
 a power supply input and output terminal receiving a first signal from the power supply side photocoupler and a second signal from the load side photocoupler;
 a control unit sensing a first power supply state of the power supply side and a second power supply state of the load side using the first signal and the second signal and converting the first power supply state into a first-power-supply-digital-signal and the second power supply state into a second-power-supply-digital-signal;
 a digital input and output device inputting the first-power-supply-digital-signal, the second-power-supply-digital-signal, and the root-mean-digital-signal; and
 an RF communication unit transmitting the first digital signal, the second digital signal, and the root-mean-digital-signal in wireless communication.

5. The remote electricity safety diagnosis system as claimed in claim 4, wherein the digital control module further includes a microprocessor controlling the branch breaker to determine a voltage or current state according to the received digital signal and control a branch breaker, and
 the digital input and output device is configured to output a digital force trip signal according to the current and voltage state determined through the microprocessor, convert the force trip signal into the analog signal through the control unit to be output through the power supply input and output terminals and penetrate through the zero current transformer of the branch breaker.

6. The remote electricity safety diagnosis system as claimed in claim 3, wherein the SMPS includes:
 a peak voltage sensing unit converting a highest value of the AC voltage input by performing full wave rectification on a primary commercial power supply into a DC value to generate a signal so as to sense a magnitude in AC voltage and output in the DC voltage form;
 a triangular wave oscillator oscillating a triangular wave compared with the magnitude in the DC value of the peak voltage sensing unit;
 a comparator unit generating a square wave while performing a switching operation by comparing the magnitude of the DC value of the peak voltage sensing unit with the triangular wave;
 an isolation and signal transfer unit including a photocoupler turned-on when the square wave is generated in the comparator unit and transferring the square wave to the secondary side; and
 a smoothing and adjusting unit converting the square signal transferred through the isolation and signal transfer unit into the DC value.

7. The remote electricity safety diagnosis system as claimed in claim 3, wherein the sensor module is configured to include any one of a thermal sensing sensor, a smoke sensor, a flooding sensor, and a vibration sensor and outlet contact defect detection sensor and to transmit the detected signals to the gateway module in a Zigbee wireless communication scheme.

8. The remote electricity safety diagnosis system as claimed in claim 7, wherein the outlet contact defect detection sensor includes:
 a voltage detection unit detecting the voltage of the outlet;
 an amplifier amplifying a signal waveform output from the voltage detection unit;
 a reference voltage generation unit generating reference voltage to the voltage state of the contact defects of the voltage detection unit;

a comparator determining increased voltage amount by comparing the output signal of the amplification unit with the output; and a communication unit digitalizing the increased voltage amount determined in the comparator and transmitting the digitalized voltage amount to the gateway module.

9. The remote electricity safety diagnosis system as claimed in claim 1, wherein the processor makes a message including an ID field of the black box unit, a power data field, and a sensing data field and transmits the message to the remote server at the time of generating a predetermined duration and a specific event.

10. The remote electricity safety diagnosis system as claimed in claim 9, wherein the power data field includes a supply state of a main power supply, a supply state of a lamp, and a supply state of other power supplies to a certain number of bits and the sensing data field includes each sensing data of at least two different sensors to a certain number of bits, respectively.

11. The remote electricity safety diagnosis system as claimed in claim 10, wherein the processor determines retransmission according to a specific field value of a response message from the remote server.

12. The remote electricity safety diagnosis system as claimed in claim 9, wherein the processor calculates a safety factor using the sensing data and stores the safety factor in the black box unit and transmits a message with the safety factor to the remote server.

13. The remote electricity safety diagnosis system as claimed in claim 1, further comprising an apparatus for detecting contact defects within an electric connector,
wherein the apparatus includes:
a voltage detection unit connects to an electric connector and detects and outputs voltage according to an increase in contact resistance;
an amplification unit amplifying and outputting the voltage input from the voltage detection unit;
a comparison unit and outputting a voltage variation which is a difference between the voltage from the amplification unit and the received reference voltage; and
a communication unit converting the voltage variation into a digital data and transmitting the digital data to the outside, wherein the apparatus for detecting contact defects receives the power from the AC power supply connected with the electric connect.

14. The remote electricity safety diagnosis system as claimed in claim 13, wherein the communication unit transmits its own identifier and information regarding the contact defects to the outside.

15. An apparatus for diagnosing electricity safety occurring in a switch gear to analyze a risk, comprising:
an arc data detection unit sensing the arc occurring in the switch gear or the universal distribution panel and storing the sensed arc as the arc data;
a data determination unit determining whether the arc data detected in the arc data detection unit exceeds a predetermined threshold level; and a first risk determination unit increasing a risk when the arc data exceeds a threshold level of the arc data detected at the predetermined time and generating the alarm signal due to the arc occurrence when the risk exceeds a predetermined alarm level,
wherein the partial discharge diagnosis module includes:
a partial discharge data generation unit measuring a discharge signal in the switch gear and generating the partial discharge data; and
a phase cascade array generation unit performing phi-q-n analysis for the partial discharge data and generating a phase cascade array.

16. The apparatus for diagnosing electricity safety as claimed in claim 15, wherein the first risk determination unit calculates the risk and analyzes the arc generation trend by an on/off contact scheme or an analog linear signal detection scheme.

17. The apparatus for diagnosing electricity safety as claimed in claim 15, wherein the partial discharge diagnosis module selects a frequency band other than frequency bands in which previously known noises are distributed and measures whether the partial discharge occurs.

18. The apparatus for diagnosing electricity safety as claimed in claim 17, wherein the partial discharge diagnosis module determines the detected signal as noises when the magnitude of the detected signal is the predetermined threshold level.

19. The apparatus for diagnosing electricity safety as claimed in claim 18, wherein the partial discharge diagnosis module generates statistical parameters of plural kinds by measuring the partial discharge and generates a risk diagnosis index for the partial discharge using the statistical parameters and analyzes the risk due to the partial discharge.

20. The apparatus for diagnosing electricity safety as claimed in claim 18, wherein the partial discharge diagnosis module includes:
a statistical parameter generation unit generating the statistical parameters by using the phase cascade array;
a risk diagnosis index generation unit entering the statistical parameters into two or more algorithms and generating the risk diagnosis index due to the partial discharge; and
a second risk determination unit determining the risk due to the partial discharge by analyzing the risk diagnosis index due to the partial discharge.

21. The apparatus for diagnosing electricity safety as claimed in claim 20, wherein a risk diagnosis index generation unit entering the statistical parameters into an NN algorithm and an MDA algorithm with a weight value for the NN algorithm and a weight value for the MDA algorithm.

22. The apparatus for diagnosing electricity safety as claimed in claim 21, further comprising: a display unit mounted in the switch gear and indicating an alarm list and the trend of the arc generation or the partial discharge generation.

* * * * *